(12) United States Patent
Stanfill et al.

(10) Patent No.: US 8,484,159 B2
(45) Date of Patent: *Jul. 9, 2013

(54) MANAGING METADATA FOR GRAPH-BASED COMPUTATIONS

(75) Inventors: Craig W. Stanfill, Lincoln, MA (US); J. Skeffington Wholey, Belmont, MA (US); Brond Larson, Sharon, MA (US); Glenn John Allin, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/977,545

(22) Filed: Dec. 23, 2010

(65) Prior Publication Data
US 2011/0093433 A1    Apr. 21, 2011

Related U.S. Application Data

(63) Continuation of application No. 11/167,902, filed on Jun. 27, 2005, now Pat. No. 7,877,350.

(51) Int. Cl.
*G06F 7/00* (2006.01)
*G06F 17/00* (2006.01)

(52) U.S. Cl.
USPC .......................................................... 707/609

(58) Field of Classification Search
USPC ........................................ 707/609, 999.101
See application file for complete search history.

(56) References Cited

U.S. PATENT DOCUMENTS

| | | | |
|---|---|---|---|
| 3,662,343 A | 5/1972 | Goldstein et al. |
| 3,662,401 A | 5/1972 | Collins et al. |
| 4,922,418 A | 5/1990 | Dolecek |
| 4,972,314 A | 11/1990 | Getzinger et al. |
| 5,127,104 A | 6/1992 | Dennis |
| 5,276,899 A | 1/1994 | Neches |
| 5,280,619 A | 1/1994 | Wang |
| 5,301,336 A | 4/1994 | Kodosky |
| 5,323,452 A | 6/1994 | Dickman et al. |
| 5,333,319 A | 7/1994 | Silen |
| 5,357,632 A | 10/1994 | Pian et al. |
| 5,495,590 A | 2/1996 | Comfort et al. |
| 5,630,047 A | 5/1997 | Wang |

(Continued)

FOREIGN PATENT DOCUMENTS

| JP | 64-013189 | 1/1989 |
|---|---|---|
| JP | 06-236276 | 8/1994 |

(Continued)

OTHER PUBLICATIONS

International Search Report & Written Opinion received in PCT application No. PCT/US2011/040440, mailed Oct. 12, 2011, 13 pages.

(Continued)

*Primary Examiner* — Aleksandr Kerzhner
(74) *Attorney, Agent, or Firm* — Fish & Richardson P.C.

(57) ABSTRACT

Determining metadata associated with a graph-based computation includes functionally transforming metadata associated with a first portion of a graph to generate transformed metadata associated with a second portion of the graph; determining a third portion of the graph related to the second portion of the graph; and propagating the transformed metadata from the second portion of the graph to the third portion of the graph.

27 Claims, 17 Drawing Sheets

U.S. PATENT DOCUMENTS

| | | |
|---|---|---|
| 5,692,168 A | 11/1997 | McMahan |
| 5,701,400 A | 12/1997 | Amardo |
| 5,712,971 A | 1/1998 | Stanfill et al. |
| 5,745,778 A | 4/1998 | Alfieri |
| 5,802,267 A | 9/1998 | Shirakihara et al. |
| 5,805,462 A | 9/1998 | Poirot et al. |
| 5,857,204 A | 1/1999 | Lordi et al. |
| 5,923,832 A | 7/1999 | Shirakihara et al. |
| 5,924,095 A | 7/1999 | White |
| 5,930,794 A | 7/1999 | Linenbach et al. |
| 5,933,640 A | 8/1999 | Dion |
| 5,966,072 A | 10/1999 | Stanfill et al. |
| 5,999,729 A | 12/1999 | Tabloski, Jr. et al. |
| 6,006,242 A | 12/1999 | Poole et al. |
| 6,012,094 A | 1/2000 | Leyman |
| 6,014,670 A | 1/2000 | Zamanian et al. |
| 6,016,516 A | 1/2000 | Horikiri |
| 6,032,158 A | 2/2000 | Mukhopadhhyay et al. |
| 6,038,558 A | 3/2000 | Powers et al. |
| 6,044,211 A | 3/2000 | Jain |
| 6,044,374 A | 3/2000 | Nesamoney et al. |
| 6,044,394 A | 3/2000 | Cadden et al. |
| 6,088,716 A | 7/2000 | Stanfill et al. |
| 6,145,017 A | 11/2000 | Ghaffari |
| 6,173,276 B1 | 1/2001 | Kant et al. |
| 6,208,345 B1 | 3/2001 | Sheard et al. |
| 6,256,637 B1 | 7/2001 | Venkatesh et al. |
| 6,259,988 B1 | 7/2001 | Galkowski et al. |
| 6,272,650 B1 | 8/2001 | Meyer et al. |
| 6,301,601 B1 | 10/2001 | Helland |
| 6,314,114 B1 | 11/2001 | Coyle et al. |
| 6,324,437 B1 | 11/2001 | Frankel et al. |
| 6,330,008 B1 | 12/2001 | Razdow et al. |
| 6,339,775 B1 | 1/2002 | Zamanian et al. |
| 6,400,996 B1 | 6/2002 | Hoffberg et al. |
| 6,401,216 B1 | 6/2002 | Meth et al. |
| 6,437,796 B2 | 8/2002 | Sowizral et al. |
| 6,449,711 B1 | 9/2002 | Week |
| 6,480,876 B2 | 11/2002 | Rehg et al. |
| 6,496,961 B2 | 12/2002 | Gupta et al. |
| 6,538,651 B1 | 3/2003 | Hayman et al. |
| 6,584,581 B1 | 6/2003 | Bay et al. |
| 6,608,628 B1 | 8/2003 | Ross et al. |
| 6,611,862 B2 | 8/2003 | Reisman |
| 6,651,234 B2 | 11/2003 | Gupta et al. |
| 6,654,907 B2 | 11/2003 | Stanfill et al. |
| 6,658,464 B2 | 12/2003 | Reisman |
| 6,715,145 B1 | 3/2004 | Bowman-Amuah |
| 6,728,879 B1 | 4/2004 | Atkinson |
| 6,813,761 B1 | 11/2004 | Das et al. |
| 6,816,825 B1 | 11/2004 | Ashar et al. |
| 6,832,369 B1 | 12/2004 | Kryka et al. |
| 6,848,100 B1 | 1/2005 | Wu et al. |
| 6,879,946 B2 | 4/2005 | Rong et al. |
| 7,062,483 B2 | 6/2006 | Ferrari et al. |
| 7,082,604 B2 | 7/2006 | Schneiderman |
| 7,085,426 B2 | 8/2006 | August |
| 7,103,597 B2 | 9/2006 | McGovern |
| 7,103,620 B2 | 9/2006 | Kunz et al. |
| 7,130,484 B2 | 10/2006 | August |
| 7,137,116 B2 | 11/2006 | Parkes et al. |
| 7,164,422 B1 | 1/2007 | Wholey et al. |
| 7,165,030 B2 | 1/2007 | Yi et al. |
| 7,167,850 B2 | 1/2007 | Stanfill |
| 7,316,001 B2 | 1/2008 | Gold et al. |
| 7,356,819 B1 | 4/2008 | Ricart et al. |
| 7,398,514 B2 | 7/2008 | Ulrich et al. |
| 7,417,645 B2 | 8/2008 | Beda et al. |
| 7,457,984 B2 | 11/2008 | Kutan |
| 7,467,383 B2 | 12/2008 | Inchingolo et al. |
| 7,505,975 B2 | 3/2009 | Luo |
| 7,577,628 B2 | 8/2009 | Stanfill |
| 7,636,699 B2 | 12/2009 | Stanfill |
| 7,716,630 B2 | 5/2010 | Wholey et al. |
| 7,840,949 B2 | 11/2010 | Schumacher et al. |
| 7,870,556 B2 | 1/2011 | Wholey et al. |
| 7,877,350 B2 | 1/2011 | Stanfill et al. |
| 7,979,479 B2 | 7/2011 | Staebler et al. |
| 2001/0055019 A1 | 12/2001 | Sowizral et al. |
| 2002/0080181 A1 | 6/2002 | Razdow et al. |
| 2002/0087921 A1 | 7/2002 | Rodriguez |
| 2002/0091747 A1 | 7/2002 | Rehg et al. |
| 2002/0091748 A1 | 7/2002 | Rehg et al. |
| 2002/0111876 A1 | 8/2002 | Rudraraju et al. |
| 2002/0129340 A1 | 9/2002 | Tuttle |
| 2002/0147745 A1 | 10/2002 | Houben et al. |
| 2002/0184616 A1 | 12/2002 | Chessell et al. |
| 2003/0004771 A1 | 1/2003 | Yaung |
| 2003/0023413 A1 | 1/2003 | Srinivasa |
| 2003/0033432 A1 | 2/2003 | Simpson et al. |
| 2003/0091055 A1 | 5/2003 | Craddock et al. |
| 2003/0126240 A1 | 7/2003 | Vosseler |
| 2003/0204804 A1 | 10/2003 | Petri et al. |
| 2004/0006745 A1 | 1/2004 | Van Heldan et al. |
| 2004/0041838 A1 | 3/2004 | Adusumilli et al. |
| 2004/0073529 A1 | 4/2004 | Stanfill |
| 2004/0093559 A1 | 5/2004 | Amaru et al. |
| 2004/0098452 A1 | 5/2004 | Brown et al. |
| 2004/0107414 A1 | 6/2004 | Bronicki et al. |
| 2004/0111469 A1 | 6/2004 | Manion et al. |
| 2004/0148373 A1 | 7/2004 | Childress et al. |
| 2004/0177099 A1 | 9/2004 | Ganesh et al. |
| 2004/0205726 A1 | 10/2004 | Chedgey et al. |
| 2004/0207665 A1* | 10/2004 | Mathur ........................ 345/853 |
| 2004/0210831 A1 | 10/2004 | Feng et al. |
| 2004/0225657 A1 | 11/2004 | Sarkar |
| 2004/0260590 A1 | 12/2004 | Golani et al. |
| 2005/0021689 A1 | 1/2005 | Marvin et al. |
| 2005/0034112 A1 | 2/2005 | Stanfill |
| 2005/0039176 A1 | 2/2005 | Fournie |
| 2005/0059046 A1 | 3/2005 | Labrenz et al. |
| 2005/0086360 A1 | 4/2005 | Mamou et al. |
| 2005/0097561 A1 | 5/2005 | Schumacher et al. |
| 2005/0102670 A1 | 5/2005 | Bretl et al. |
| 2005/0144277 A1 | 6/2005 | Flurry et al. |
| 2005/0144596 A1 | 6/2005 | McCullough et al. |
| 2005/0149935 A1 | 7/2005 | Benedetti |
| 2005/0177531 A1 | 8/2005 | Bracewell |
| 2005/0193056 A1 | 9/2005 | Schaefer et al. |
| 2005/0216421 A1 | 9/2005 | Barry et al. |
| 2005/0240621 A1 | 10/2005 | Robertson et al. |
| 2005/0262470 A1 | 11/2005 | Gavrilov |
| 2005/0289527 A1 | 12/2005 | Illowsky et al. |
| 2006/0095722 A1 | 5/2006 | Biles et al. |
| 2006/0098017 A1 | 5/2006 | Tarditi et al. |
| 2006/0206872 A1 | 9/2006 | Krishnaswamy |
| 2006/0294150 A1 | 12/2006 | Stanfill et al. |
| 2006/0294459 A1 | 12/2006 | Davis et al. |
| 2007/0011668 A1 | 1/2007 | Wholey et al. |
| 2007/0022077 A1 | 1/2007 | Stanfill |
| 2007/0035543 A1 | 2/2007 | David et al. |
| 2007/0094211 A1 | 4/2007 | Sun et al. |
| 2007/0118839 A1 | 5/2007 | Berstis et al. |
| 2007/0139441 A1 | 6/2007 | Lucas et al. |
| 2007/0143360 A1 | 6/2007 | Harris et al. |
| 2007/0150429 A1 | 6/2007 | Huelsman et al. |
| 2007/0174185 A1 | 7/2007 | McGoveran |
| 2007/0239766 A1 | 10/2007 | Papaefstathiou et al. |
| 2007/0285440 A1 | 12/2007 | MacInnis et al. |
| 2008/0049022 A1 | 2/2008 | Sherb et al. |
| 2008/0126755 A1 | 5/2008 | Wu et al. |
| 2008/0288608 A1 | 11/2008 | Johnson |
| 2008/0294615 A1 | 11/2008 | Furuya et al. |
| 2009/0030863 A1 | 1/2009 | Stanfill et al. |
| 2009/0182728 A1 | 7/2009 | Anderson |
| 2009/0193417 A1 | 7/2009 | Kahlon |
| 2009/0224941 A1 | 9/2009 | Kansal et al. |
| 2009/0327196 A1 | 12/2009 | Studer et al. |
| 2010/0070955 A1 | 3/2010 | Kahlon |
| 2010/0169137 A1 | 7/2010 | Jastrebski et al. |
| 2010/0174694 A1 | 7/2010 | Staebler et al. |
| 2010/0180344 A1 | 7/2010 | Malyshev et al. |
| 2010/0211953 A1 | 8/2010 | Wakeling et al. |
| 2010/0218031 A1 | 8/2010 | Agarwal et al. |
| 2010/0281488 A1 | 11/2010 | Krishnamurthy et al. |
| 2011/0078500 A1 | 3/2011 | Douros et al. |
| 2012/0054255 A1 | 3/2012 | Buxbaum |

FOREIGN PATENT DOCUMENTS

| | | |
|---|---|---|
| JP | 08-285592 | 10/1996 |
| JP | 08-305576 | 11/1996 |
| JP | 63-231613 | 9/1998 |
| JP | 11-184766 | 7/1999 |
| JP | 2000-99317 | 4/2000 |
| JP | 2006-504160 | 2/2006 |
| WO | WO 98/00791 | 7/1998 |
| WO | WO 02/11344 | 2/2002 |
| WO | WO2005/001687 | 1/2005 |
| WO | WO 2005/086906 | 9/2005 |
| WO | WO 2008/124319 | 10/2008 |
| WO | WO 2009/039352 | 3/2009 |

OTHER PUBLICATIONS

Babaoglu, O et al., "Mapping parallel computations onto distributed systems in Paralex" Compuero '91. Advanced Computer Technology, Reliable Systems and Applications. 5th Annual European Computer Conference. Proceedings. Bologna, Italy May 13-16, 1991, Los Alamitos, CA, USA, IEEE Comput. Soc, US, May 13, 1991, pp. 123-130.

Baer, J.L. et al., "Legality and Other Properties of Graph Models of Computations." Journal of the Association for Computing Machinery, vol. 17, No. 3, Jul. 1970, pp. 543-554.

Bookstein, A. et al., "Modeling Word Occurrences for the Compression of Concordances." ACM Transactions on Information Systems, vol. 15, No. 3, Jul. 1997, pp. 254-290.

Burch, J.R. et al., "Sequential circuit verification using symbolic model checking." In Design Automation Conference, 1990, Proceedings of the 27th ACM/IEEE. Jun. 24-28, 1990, pp. 46-51.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

Ebert, Jurgen et al., "A Declarative Approach to Graph-Based Modeling." Workshop on Graph-Theoretic Concepts in Computer Science, 1994, pp. 1-19.

European Search Report issued in application No. EP10003554, dated Sep. 24, 2010, 7 pages.

Gamma et al. "Design Patterns: Elements of Reusable Object-Oriented Software", Sep. 1999.

Guyer et al., "Finding Your Cronies: Static Analysis for Dynamic Object Colocation." Oct. 2004, ACM, pp. 237-250.

Grove et al., "A Framework for Call Graph Construction Algorithms." Nov. 2001, ACM TOPLAS, vol. 23, Issue 6, pp. 685-746.

Herniter, Marc E., "Schematic Capture with MicroSim PSpice," 2nd Edition, Prentice Hall, Upper Saddle River, N.J., 1996, pp. 51-52, 255-280, 292-297.

International Search Report & Written Opinion issued in PCT application No. PCT/US01/23552, mailed Jan. 24, 2002, 5 pages.

International Search Report & Written Opinion issued in PCT application No. PCT/US06/24957, dated Jan. 17, 2008, 14 pages.

International Search Report & Written Opinion issued in PCT application No. PCT/US07/75576, mailed Sep. 16, 2008, 13 pages.

International Search Report & Written Opinion issued in PCT application No. PCT/US08/71206, mailed Oct. 22, 2008, 12 pages.

International Search Report & Written Opinion issued in PCT application No. PCT/US10/49966, dated Nov. 23, 2010, 8 pages.

International Search Report & Written Opinion received in PCT application No. PCT/US10/24036, mailed Mar. 23, 2010, 11 pages.

Jawadi, Ramamohanrao et al., "A Graph-based Transaction Model for Active Databases and its Parallel Implementation." U. Florida Tech. Rep TR94-0003, 1994, pp. 1-29.

Just et al., "Review and Analysis of Synthetic Diversity for Breaking Monocultures." Oct. 2004, ACM, pp. 23-32.

Kebschull, U. et al., "Efficient Graph-Based Computation and Manipulation of Functional Decision Diagrams." University of Tubingen, 1993 IEEE, pp. 278-282.

Krahmer et al., "Graph-Based Generation of Referring Expressions." Mar. 2003, MIT Press, vol. 29, No. 1, pp. 53-72.

Li, Xiqing et al., "A Practical External Sort for Shared Disk MPPs." Proceedings of Supercomputing '93, 1993, 24 pages.

Martin, David et al., "Models of Computations and Systems—Evaluation of Vertex Probabilities in Graph Models of Computations." Journal of the Association for Computing Machinery, vol. 14, No. 2, Apr. 1967, pp. 281-299.

Ou, Chao-Wei et al., "Architecture-Independent Locality-Improving Transformations of Computational Graphs Embedded in κ-Dimensions." Proceedings of the 9th International Conference on Supercomputing, 1995, pp. 289-298.

"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02 >, 5 pages.

Stanfill, Craig, "Massively Parallel Information Retrieval for Wide Area Information Servers." 1991 IEEE International Conference on Systems, Man and Cybernetics, Oct. 1991, pp. 679-682.

Stanfill, Craig et al., "Parallel Free-Text Search on the Connection Machine System." Communications of the ACM, vol. 29, No. 12, Dec. 1986, pp. 1229-1239.

Stanfill, Craig, "The Marriage of Parallel Computing and Information Retrieval." IEE Colloquium on Parallel Techniques for Information Retrieval, Apr. 1989, 5 pages.

Supplemental European Search Report issued in application No. EP07813940, dated Nov. 26, 2009, 7 pages.

Supplemental European Search Report issued in application No. EP08796632, dated Sep. 24, 2010, 6 pages.

Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.

Control-M; New Dimension Software. User Manual. New Dimension Software Ltd., 1999.

Romberg, M., "UNICORE: Beyond Web-based Job-Submission," Proceedings of the 42nd Cray User Group Conference, Noordwijk (May 22-26, 2000).

"Unicenter AutoSys Job Management," Computer Associates, Copyright 2001.

Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.

Vajracharya, Suvas et al., "Asynchronous Resource Management." Proceedings of the 15[th]International Parallel and Distributed Processing Symposium, Apr. 2001, 10 pages.

Japanese Office Action, with English Translation, JP application No. 2008-519474, mailed Sep. 25, 2012, 8 pages.

Shoten, Iwanami, "Encyclopedic Dictionary of Computer Science," (with English Translation), May 25, 1990, pg. 741.

Japanese Office Action, with English Translation, JP application No. 2009-523997, mailed Oct. 23, 2012, 7 pages.

European Search Report issued in application No. EP10741775, dated Nov. 14, 2012, 4 pages.

Russell, Nick, et al., "Workflow Control-Flow Patterns A Revised View," Workflow Patterns Initiative, 2006, pp. 1-134.

van der Aalst, W.M.P., et al., "Workflow Patterns," Distributed and Parallel Databases, 14, 5-51, 2003.

Japanese Office Action, with English Translation, JP application No. 2011-000948, mailed Jan. 8, 2013, 11 pages.

Supplemental European Search Report issued in application No. EP06774092, dated Dec. 19, 2012, 5 pages.

"Topical sorting," Wikipedia, accessed Dec. 10, 2012, 2 pages.

"Visual Lint: Squash Bugs Early with Interactive C/C++, C# and Java Code Analysis for Microsoft Visual Studio and Eclipse," [retrieved from the internet Dec. 3, 2012; www.riverblade.co.uk/products/visual_lint.] (2 pages).

Japanese Office Action, with English Translation, JP application No. 2010-518415, mailed Feb. 21, 2013, 11 pages.

Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.

Evripidou, Paraskevas, et al., "Incorporating input/output operations into dynamic data-flow graphs," Parallel Computing 21 (1995) 1285-1311.

Extended European Search Report, EP 12165575, mailed May 10, 2013, 9 pages.

Frankl, Phyllis G., et al., "An Applicable Family of Data Flow Testing Criteria," IEEE Transactions on Software Engineering, vol. 14, No. 10, Oct. 1988, pp. 1483-1498.

Whiting, Paul G., et al., "A History of Data-Flow Languages," IEEE Annals of the History of Computing, vol. 16, No. 4, 1994, pp. 38-59.

* cited by examiner

700 ↘

| Compute | Source field | Expression | | Where | | Output field |
|---|---|---|---|---|---|---|
| ▼ | value of ▼ | | [Edit] | | [Edit] ⇒ | |
| ▼ | value of ▼ | | [Edit] | | [Edit] ⇒ | |
| ▼ | value of ▼ | | [Edit] | | [Edit] ⇒ | |
| ▼ | value of ▼ | | [Edit] | | [Edit] ⇒ | |
| ▼ | value of ▼ | | [Edit] | | [Edit] ⇒ | |
| 702 | 704 | 706 | | 708 | | 710 |

Copy these input fields:

[ Select All ] [ Select None ]

802 — ☐  a
       ☐  b
       ☐  c
802 — ☐  d
       ☐  e

Compute these new fields:

| Expression | | Output field |
|---|---|---|
| | ⇒ | |
| | ⇒ | |
| | ⇒ | |
| | ⇒ | |
804 — | | ⇒ | | — 806

FIG. 8

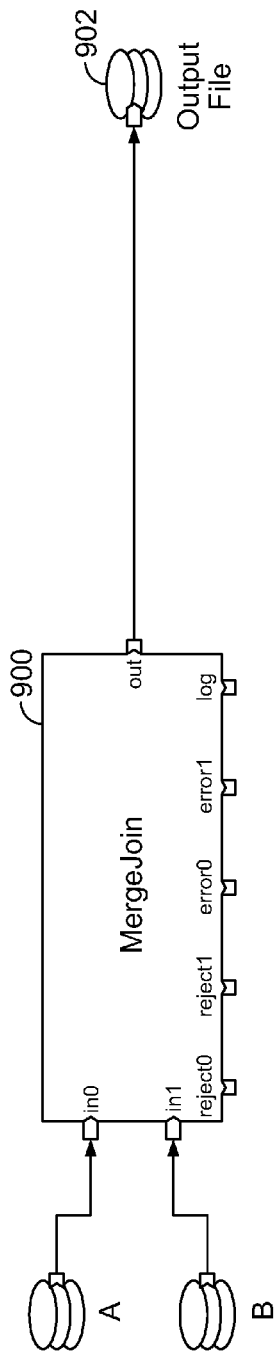
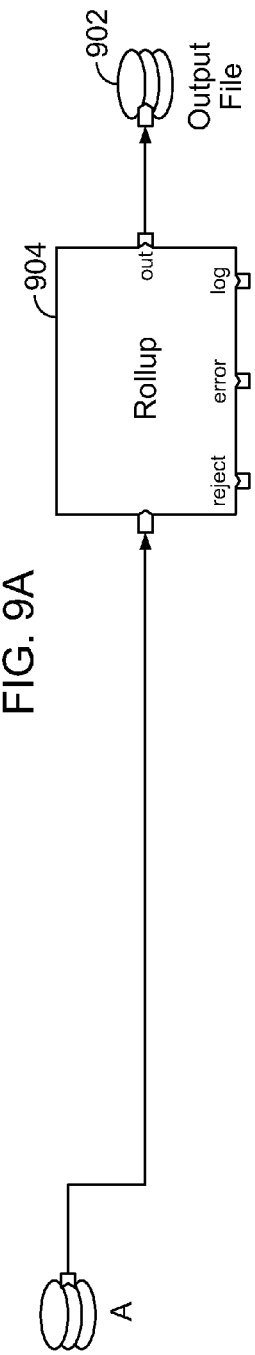
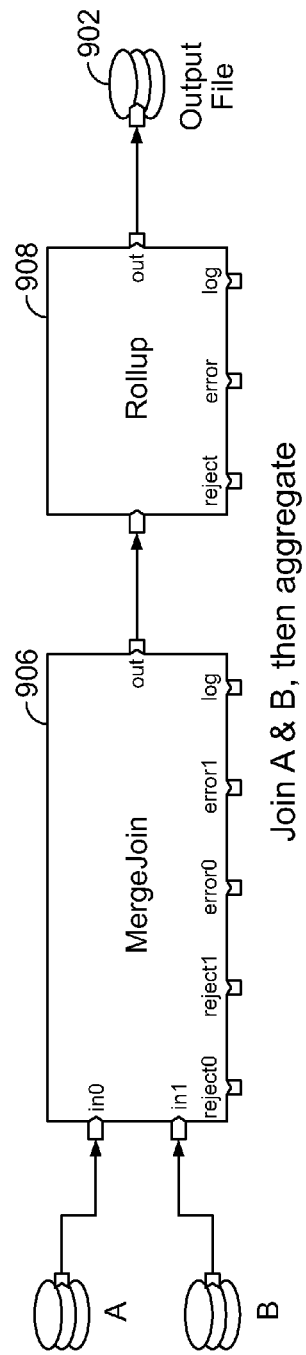

1700
1702 — Input dataset repository path [                    ] [Browse]
1704 — Key to rollup by   [Unset]                          [Edit]
1706 — Rollup rules       No rules                         [Edit]
1708 — Output path        [                              ]

FIG. 17A 1700
1710
1702 — Input dataset repository path  [/Schema/Warehouse/CallDetail] [Browse]
1704 — Key to rollup by   dt ─1712                                   [Edit]
1706 — Rollup rules       max(duration) ⇒ max_duartion ─1714         [Edit]
                          min(duration) ⇒ min_duartion
                          # records     ⇒ num_calls
1708 — Output path        [results.dat]                     ─1716

FIG. 17B

MANAGING METADATA FOR GRAPH-BASED COMPUTATIONS

CROSS-REFERENCE TO RELATED APPLICATIONS

This application is a continuation of and claims priority to U.S. application Ser. No. 11/167,902, filed on Jun. 27, 2005, now U.S. Pat. No. 7,877,350 incorporated herein by reference.

TECHNICAL FIELD

The invention relates to the control of computations in data processing systems and, more particularly, to managing metadata for graph-based computations.

BACKGROUND

Complex business systems typically process data in multiple stages, with the results produced by one stage being fed into the next stage. The overall flow of information through such systems may be described in terms of a directed data flow graph, with vertices in the graph representing components (either data files or processes), and the links or "edges" in the graph indicating flows of data between components.

The same type of graphic representation may be used to describe parallel processing systems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. Again, the graphs will be composed of components (data files or processes) and flows (graph edges or links). By explicitly or implicitly replicating elements of the graph (components and flows), it is possible to represent parallelism in a system.

Graphs also can be used to invoke computations directly. The "CO>OPERATING SYSTEM®" with Graphical Development Environment (GDE) from Ab Initio Software Corporation, Lexington, Mass. embodies such a system. Graphs made in accordance with this system provide methods for getting information into and out of individual processes represented by graph components, for moving information between the processes, and for defining a running order for the processes. This system includes algorithms that choose interprocess communication methods and algorithms that schedule process execution, and also provides for monitoring of the execution of the graph.

Developers quite often build graphs that are controlled in one way or another through the use of environment variables or command-line arguments which enable generation of instructions (e.g., shell scripts) that are translated into executable instructions by a graph compiler at "runtime" (i.e., when the graph is executed). Environment variables and command-line arguments thus become ad hoc parameters for specifying information such as file names, data select expressions, and keys (e.g., sort keys), making the applications more flexible. However, a user may have to read a generated shell script and search it for references to environment variables and command-line arguments to find the set of parameters that control the execution of a particular graph.

SUMMARY

In a general aspect, the invention features a method, and corresponding software and system, for determining metadata associated with a graph-based computation. The method includes functionally transforming metadata associated with a first portion of a graph to generate transformed metadata associated with a second portion of the graph; determining a third portion of the graph related to the second portion of the graph; and propagating the transformed metadata from the second portion of the graph to the third portion of the graph.

This aspect can include one or more of the following features:

The third portion of the graph is related to the second portion of the graph by a data flow.

The data flow includes a data flow between ports of two interconnected graph elements.

The data flow includes an internal data flow between two ports of a graph element.

The third portion of the graph is related to the second portion of the graph by a link indicating that metadata associated with second portion should also be associated with the third portion.

The first portion includes a first port of a first graph element, and the second portion includes a second port of the first graph element.

The functional transformation includes a metadata definition that includes at least one reference to the metadata associated with the first port.

The metadata definition defines metadata for the second port as a function of the referenced metadata.

The first port is an input port and the second port is an output port.

The metadata being functionally transformed supplied by a user.

The metadata being functionally transformed is propagated from a fourth portion of the graph.

The method further includes propagating the transformed metadata in response to a change in connectivity of the graph.

The method further includes propagating the transformed metadata in response to a user action.

The method further includes receiving a request from a user; and displaying metadata associated with a graph element to the user in response to the request.

The request from the user includes input from the user selecting a graph element for which metadata is to be displayed.

The input from the user includes positioning an on-screen pointer near a graphical representation of the selected graph element for a predetermined amount of time.

The displayed metadata includes metadata propagated from another graph element.

The displayed metadata is displayed before the graph is run.

Aspects of the invention can include one or more of the following advantages:

The interface of a graph in terms of runtime parameters has been formalized. The interface for a graph has been defined well enough for the system to know what parameters need to be supplied and how they should be prompted for.

The metadata that controls components can be specified or computed, directly or indirectly, by runtime parameters.

The structure of a graph can be modified based on the values of runtime parameters controlling conditional components, so that components are present or absent based on user choices.

A benefit of runtime parameterization of graphs is that an application can be parameterized richly enough to enable end users, such as business analysts and statistical modelers, to request data that meets their needs. The complexity of modern corporate data environments has led to a state of affairs in which a significant amount of direct human involvement is usually needed in the process of data collection and pre-analysis transformation. The invention provides powerful tools to end users that enables them to define and retrieve the data they want without requiring expert data analyzers in the critical path for each query type.

Metadata that is propagated within a graph can include metadata that is functionally transformed, such as metadata that is defined as a function of other metadata. The propagation can occur, for example, at edit time before the graph is run. Enabling propagation of transformed metadata can enhance a user's ability to view and/or manipulate metadata even before the graph is run.

There can be a library of reusable (inter-connectable) components with runtime parameters. A graph can be built from these components with an automatically determined prompting order for all of the runtime parameters in the graph. In some cases parameters may need to be reordered to satisfy certain constraints. Reordering parameters to satisfy those constraints according to a desired ordering (e.g., an ordering specified by a developer) reduces the chance of prompting a user for parameters in an order that deviates significantly from the desired ordering.

Other features and advantages of the invention will become apparent from the following description, and from the claims.

DESCRIPTION OF DRAWINGS

FIG. 7 is a diagram of one embodiment of a graphical dialog generated by the rollup prompt.

FIG. 8 is a diagram of one embodiment of a graphical dialog generated by the reformat prompt.

FIG. 9A is a diagram of a first graph in which a MergeJoin component joins data from files A and B and outputs the result to an output file.

FIG. 9B is a block diagram of a second graph in which a Rollup component aggregates data from file A and outputs the result to an output file.

FIG. 9C is a block diagram of a graph in which a MergeJoin component joins data from files A and B, and a Rollup component aggregates the resulting data and outputs a final result to an output file.

FIG. 17A is a diagram of one embodiment of a graphical dialog representing a form generated by the Web Interface from the information in the parameters grid of FIG. 16.

FIG. 17B is a diagram of the form of FIG. 17A filled in by a user with parameter values.

Like reference symbols in the various drawings indicate like elements.

DETAILED DESCRIPTION

Overview

Figure 1A:
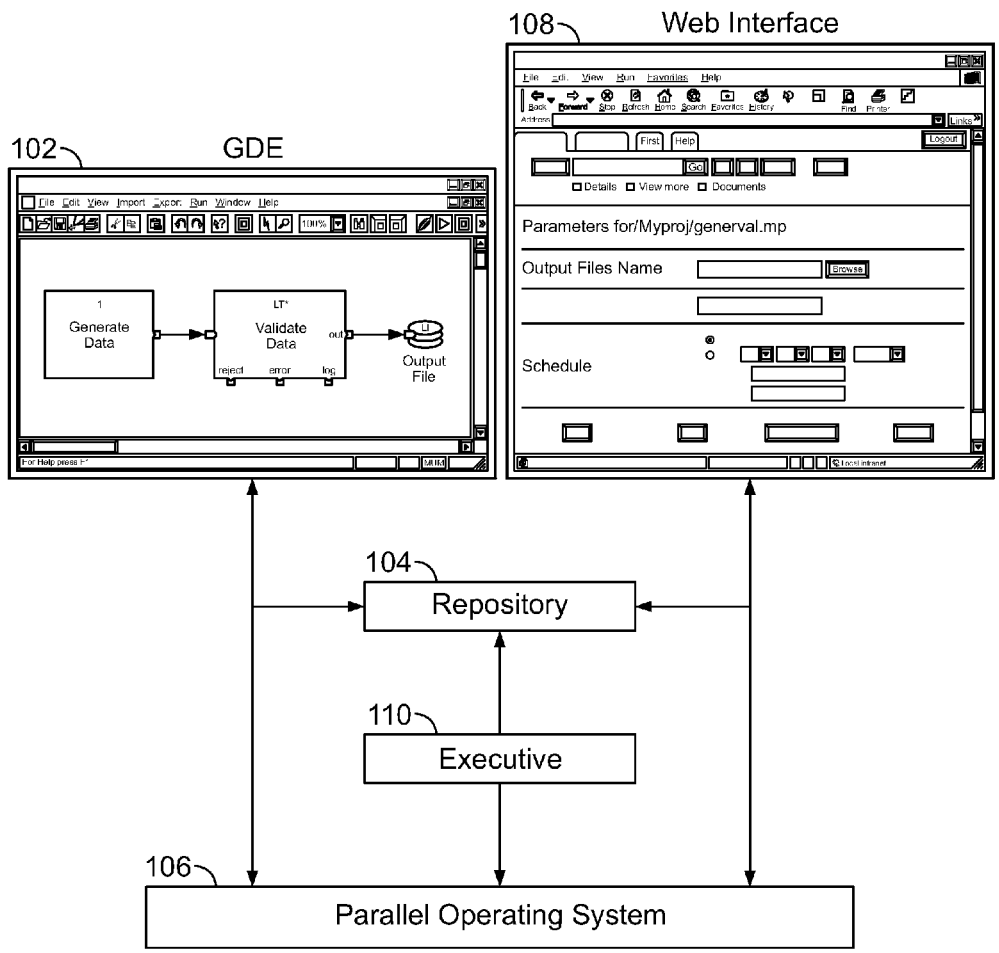
FIG. 1A is a block diagram of one embodiment of the invention showing the interrelationship of principal elements.

FIG. 1A is a block diagram of one embodiment of the invention showing the interrelationship of principal elements. A graphic development environment (GDE) 102 provides a user interface for creating executable graphs and defining parameters for the graph components. The GDE may be, for example, the CO>OPERATING SYSTEM® GDE available from the assignee of the present invention. The GDE 102 communicates with a repository 104 and a parallel operating system 106. Also coupled to the repository 104 and the parallel operating system 106 are a Web Interface 108 and an executive 110.

The repository 104 preferably is a scalable object-oriented database system designed to support the development and execution of graph-based applications and the interchange of metadata between the graph-based applications and other systems (e.g., other operating systems). The repository 104 is a storage system for all kinds of metadata, including (but not limited to) documentation, record formats, transform functions, graphs, jobs, and monitoring information. Repositories are known in the art; see, for example, U.S. Pat. Nos. 5,930,794; 6,032,158; 6,038,558; and 6,044,374.

The parallel operating system 106 accepts the representation of a data flow graph generated in the GDE 102 and generates computer instructions that correspond to the processing logic and resources defined by the graph. The parallel operating system 106 then typically executes those instructions on a plurality of processors (which need not be homogeneous). A suitable parallel operating system is the CO>OPERATING SYSTEM® available from the assignee of the present invention.

The Web Interface 108 provides a web-browser-based view of the contents of the repository 104. Using the Web Interface 108, a user may browse objects, create new objects, alter existing objects, specify application parameters, schedule jobs, etc. The Web Interface 108 automatically creates a forms-based user interface for a parameterized graph based on information stored in the repository 104 for the graph's runtime parameters.

The executive 110 is an optional repository-based job scheduling system accessed through the Web Interface 108. The executive 110 maintains jobs and job queues as objects within the repository 104, and the Web Interface 108 provides a view of and facilities to manipulate jobs and job queues.

Figure 1B:
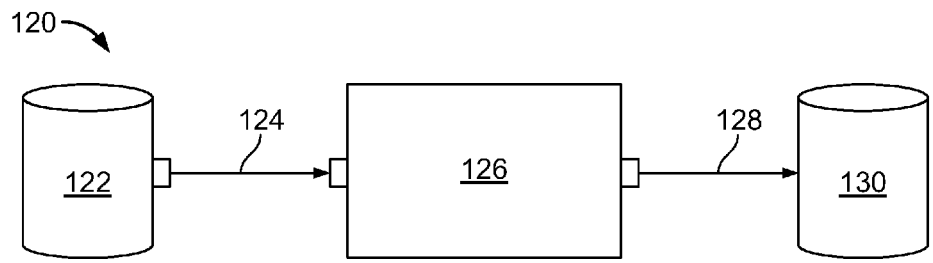
FIG. 1B is a block diagram of a data flow graph.

FIG. 1B shows a simple data flow graph 120 with an input dataset 122 connected by a flow 124 to a filter component 126. The filter component 126 is connected by a flow 128 to an output dataset 130. A dataset can include, for example, a file or a database table that provides data (e.g., an input dataset) or receives data (e.g., an output dataset) for a computation performed by a data flow graph.

The flow of data represented by a "flow" in a data flow graph can be organized into discrete data elements. For example, the elements can include records from a dataset that is organized into records (or rows) and fields (or columns). Metadata describing the sequence of fields and data types corresponding to values in a record is called a "record format."

Components and datasets in a graph have input and/or output ports for connecting to flows. The "source ends" of the flows 124 and 128 interface with an output port of the input dataset 122 and with an output port of the filter component 126, respectively. The "sink ends" of the flows 124 and 128 interface with an input port of the filter component 126 and with an input port of the output dataset 130, respectively. An input or output port of a dataset or component is associated with metadata, such as a record format for the data flowing into or out of the port.

A parameter including a record format for a port or other metadata associated with a component is bound to a value according to rules for parameter scoping. A parameter can be bound to a value at design time or at runtime (i.e., a "runtime parameter," as described below). The value of a parameter can be defined, for example, by a user over a user interface (e.g., in response to a prompt), defined from a file, or defined in terms of another parameter in the same context or a in different context. For example, a parameter can be exported from a different context (e.g., a parameter evaluated in the context of a different component) by designating the parameter to have a "same as" relationship to another parameter.

A component used in a graph can be implemented using other components that are interconnected with flows forming a "sub-graph." Before a sub-graph is used as a component in another graph, various characteristics of the component are defined such as the input and/or output ports of the component. In some cases, characteristics of a component having to do with relationships among sub-graph components should be specified before the component is used in a graph. For example, a prompting order for runtime parameters of sub-graph components may need to be selected. An approach for selecting a prompting order for runtime parameters of components in a graph is described in more detail below.

Metadata Propagation

The value of metadata associated with a port, such as a record format parameter, can be obtained by "propagation." Metadata propagation can occur "externally" or "internally." For external metadata propagation, the value of a record format parameter for a port of a first component can obtain a value by propagating a record format value for a port of a second component that is connected to the first component by a flow. The value is able to propagate either downstream from the source end to the sink end of a flow or upstream from the sink end to the source end of a flow. Metadata propagates from a port that has defined metadata to a port that does not have defined metadata.

For internal metadata propagation, metadata defined for one port of a component propagates to another port of that component based on a sub-graph that implements the component. In some cases, internal metadata propagation occurs over "non-transforming" internal data paths. For example, a user may provide metadata for the input port of a sort component that specifies the data type of records flowing into the sort component. Since the sort component re-orders but does not transform the records, the data type is not changed by the sort component and the data type propagates unchanged to the output port of the sort component accurately describing the data type of the records flowing out of the sort component.

Some components do transform (or optionally transform) data flowing through them. For example, a user may provide metadata for the input port of a filter component that specifies the fields of records flowing into the filter component. The filter component may remove values of a given field from each record. A metadata definition can be used to specify that the metadata for the output port of the filter component is related to the metadata of the input port according to the filter action of the component. For example, the filtered field may be removed from the metadata specifying the record fields. Such a metadata definition can be supplied even before the input port metadata is known. Therefore, metadata can propagate even over transforming internal data paths by allowing metadata associated with a port to be specified as a function of one or more parameters, including metadata for another port, as described in more detail below.

This internal and external metadata propagation can optionally be configured to occur at design time while a graph is being constructed and a user supplies metadata for some ports of some components in the graph. Alternatively, metadata propagation can occur after a graph is constructed, including at or just before runtime.

Runtime Parameters

A runtime parameter allows an application builder to defer the value of a parameter setting (e.g., the key parameter of a sort function, file names, record formats, transform functions, etc.) to runtime (e.g., the time a program is executed or soon to be executed on a computer system). The values of runtime parameters may be supplied by the end user or be derived from a combination of other runtime parameters or objects stored in an object repository.

Runtime parameters add a certain amount of flexibility to an application. Additional flexibility is achieved by using those parameters to compute metadata (data formats or types, and program logic or transforms) on demand. Types and transforms may be synthesized from other types and transforms, user-supplied parameter values, and stored objects (e.g., from a repository). This makes it possible to build "generic" applications that work on input data of any type, or that produce data through a series of transforms whose construction is controlled, directly or indirectly, through runtime parameter values.

In some implementations, when creating or editing a runtime parameter, a developer may specify a prompt for each parameter and the conditions for displaying the prompt. The system interprets the prompting directives to present, if conditions are met, a graphical user interface (GUI) control for receiving the parameter value.

Designation of Runtime Parameters

Runtime parameters provide a mechanism for a developer to modify the behavior of a graph based on external input at graph execution time (i.e., runtime). In the preferred embodiment, these external values are provided by direct user input. However, these external values also may come from a number of different sources, including environment variables and command line parameters. The GDE 102 generates the correct code to handle all of these situations as well as prompting the developer for test values when the graph is executed directly from the GDE. Using runtime parameters, a developer can, for example, explicitly declare that the path of an input file will be provided by an environment variable with a particular name; that environment variable then becomes a known part of the graph's interface. Thus, there is a well-defined interface to such parameters. There is no need, for example, to read a generated shell script and search it for references to environment variables and command-line arguments to find the set of parameters that control the execution of a particular graph.

Figure 2:
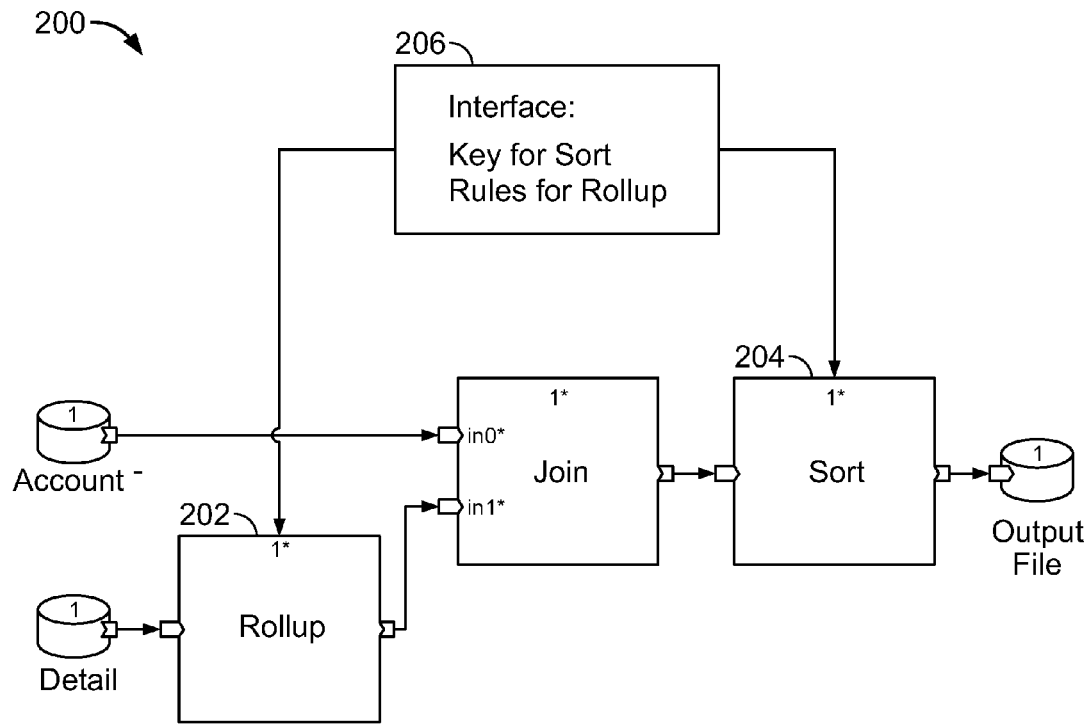
FIG. 2 is a block diagram of a typical graph having a rollup component and a sort component 204 with designated runtime parameters.

FIG. 2 is a block diagram of a typical graph 200 having a rollup component 202 and a sort component 204 with designated runtime parameters. The runtime parameters (a key for the sort component 204 and rules for the rollup component 202) would be presented to a user in an interface 206 for input. The following sections describe how to designate a runtime parameter, and create an integrated user interface for presentation of runtime parameters prompting for user input.

Figure 3:
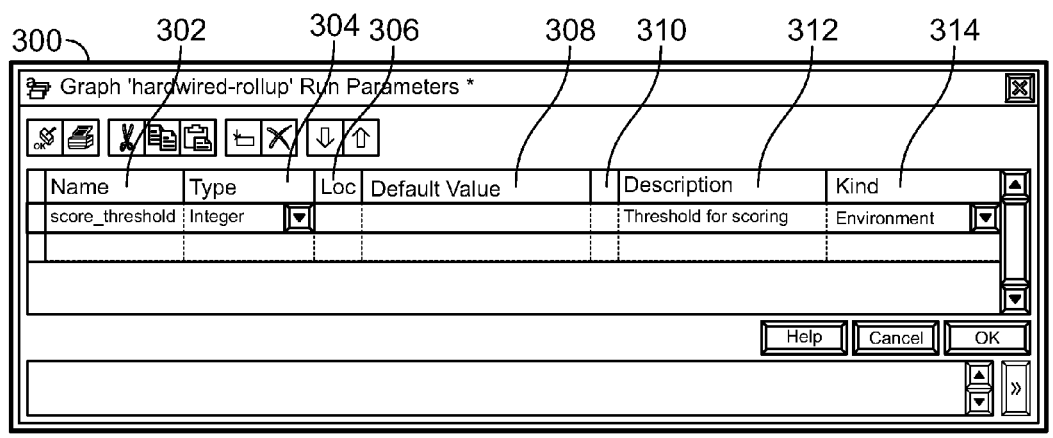
FIG. 3 is a diagram of one embodiment of a graphical dialog representing a runtime parameters grid that would be associated with a graph.

A runtime parameter may be designated or defined in a number of ways. One way is by use of a runtime parameters grid displayed in the GDE 102. FIG. 3 is a diagram of one embodiment of a graphical dialog representing a runtime parameters grid 300 that would be associated with a graph. A new runtime parameter is created by simply filling in the appropriate fields. An object associated with each runtime parameter is created in the repository 104 and linked to all graph components that utilize the parameter. For example, if a sort key for a graph sort component is defined as a runtime parameter, an object representing the sort key parameter is stored in the repository 104 and linked to the associated sort component. An alternative way of defining a runtime parameter is to specially flag an existing parameter of a graph component and make it "visible" (export it) to other components. A combination of these methods may be used. For example, when creating a component, a developer may designate a particular parameter of that component as a runtime parameter. The developer may then use a parameter grid to set default values and other characteristics of all of the runtime parameters for a graph, and define new runtime parameters.

When the graph is run, the parameters are processed to obtain values for each parameter from user input or from external programmatic sources (e.g., command line parameters or environmental variables). In the illustrated embodiment, the runtime parameters grid 300 includes the following fields:

Name 302—This field contains the name of the runtime parameter. "Score threshold" is the example shown for a name.

Type 304—This field contains the type of value to be allowed in the runtime parameter. "Integer" is the example shown for a type. Supported types in the illustrated embodiment are:
  boolean—value can be either True or False;
  choice—value is one of a list of values;
  collator—a key parameter value;
  dataset—an external data file name and location;
  date—a date value;
  expression—an arithmetic, logical, and/or conditional expression (e.g., a select expression);
  float—a floating point number;
  integer—an integer number;
  layout—a parallel or serial layout definition;
  record format—a record description or a file containing a record description;
  string—an arbitrary character string;
  transform—a transform description or a file containing a transform description.

Location (Loc) 306—This field is used with record format and transform types. It specifies whether the type field 304 describes a file location or whether it contains an embedded description. Supported locations are:
  Embedded—the parameter will contain the record or transform description;
  Host—the parameter will contain a reference to a file on a host machine;
  Local—the parameter will contain a reference to a file on a local machine;
  Repository—the parameter will contain a reference a repository transform or record format.

Default Value 308—This field contains either (1) the default value for the runtime parameter which will be used if no other value is provided from an external programmatic source, or (2) a rule or expression describing how to derive the runtime value from user input or how to obtain that information interactively from the user executing the graph. In the latter case, a second default value field (not shown) may be used to provide a value for the runtime parameter if the user does not provide an input value. For types of "boolean" and "choice", this field limits the user to the valid choices. For "layout" types, this field is read-only and displays the currently defined layout definition. For all other types, this field preferably is a simple text editor into which the user may type a valid string.

Edit 310—Clicking on the edit space 310 (or an icon; for example, a pencil icon) in a parameter row will bring up a more advanced edit window, which walks a user through the various options for editing the default value field 308. In the illustrated embodiment, the following editors are available for their associated types:
  Single line edit—for integer, float, date and string types;
  Choice dialog—for boolean and choice types;
  Key Editor—for a collator type;
  File Browser—for a dataset type and for record format and transform types where the location is not embedded;
  Transform Editor—for a transform type with a location of Embedded;
  Record Format Editor—for a record format type with a location of Embedded;
  Expression Editor—for an expression type;
  Layout Editor—for a layout type.

The above editors are launched unless the Kind field value (see below) is "PL" (for Parameter Language). In this case the user is presented with an editor with which to define the rules for deriving or prompting for the parameter value at graph execution time.

Description 312—This is a free format field in which a developer describes the expected values of the runtime parameter. It is used as a prompt at runtime if the default value contains a rule for asking the user for an input value.

Kind 314—This field defines where a graph is to obtain the value for the associated parameter at graph execution time. Supported kind field 314 values are:

Environment—The value for the runtime parameter is expected to be found in an environment variable of the same name. If the environment variable is not defined, then the value in the default value field 308 is used. If the parameter is required (i.e., an exported parameter), and the default value field 308 is empty, then a runtime error will be generated and graph execution will stop.

Positional—The value for the runtime parameter is expected at its relative position on a command line invoking the application. For example, if a runtime parameter is the third positional runtime parameter defined, then its parameter value will be expected as the third positional command line argument in an execution script. Any specified positional parameters must be provided and a runtime error will be generated if one is missing.

Keyword—The value for the runtime parameter is expected as a keyword command line parameter. In the illustrated embodiment, keyword parameters are of the form:

–<parameter name> <parameter value>.

Keyword parameters are optional and a runtime error will only be generated if the keyword parameter is not provided and the default value field 308 is blank and a corresponding exported parameter is required.

Fixed—The runtime value for the parameter is always the default value. This is useful for sharing a constant value between two or more runtime parameters.

PL—The default value of the runtime parameter contains a PL expression which will be interpreted at graph execution to either derive the value of the runtime parameter from other parameters or prompt the user for additional input. The Component Description Language that is selected for use with any particular embodiment of the invention may be any suitable scripting language, such as the publicly available object-oriented scripting language "Python". Such scripts can construct metadata (types and transforms) under program control, and perform conditional tests, comparisons, data transformations, arithmetic and logical operations, string and list manipulations, and other functions on user input, externally programmatically supplied input, and other runtime parameters to generate a final value for any runtime parameter.

In the illustrated embodiment, a useful convention for referencing a runtime parameter that has been created directly on the runtime parameters grid 300 is to simply enter the parameter name preceded by the dollar sign "$". For example, $key references a runtime variable named key. In the illustrated embodiment, new runtime parameters default to a type of "string" and a default kind based on the value in the advanced options dialog for the default runtime kind (the default runtime kind is "Environment").

Because runtime parameter values can are determined at runtime, and PL scripts can provide conditional testing, "conditional" runtime parameters can be created. A conditional runtime parameter causes a prompt to be generated for user input only if all of the conditions for the parameter—determined at runtime—are enabling. Thus, for example, if a user responds to a first prompt requesting whether a data set is to be sorted with "NO", a second, conditional prompt that requests a sort key need not be displayed.

Thus, during a design phase ("design time"), a developer designates a particular parameter of a graph component as a "runtime" parameter. An object associated with that graph component is then stored with the relevant parameter data (e.g., the types of information from the parameters grid 300 of FIG. 2).

Figure 4:
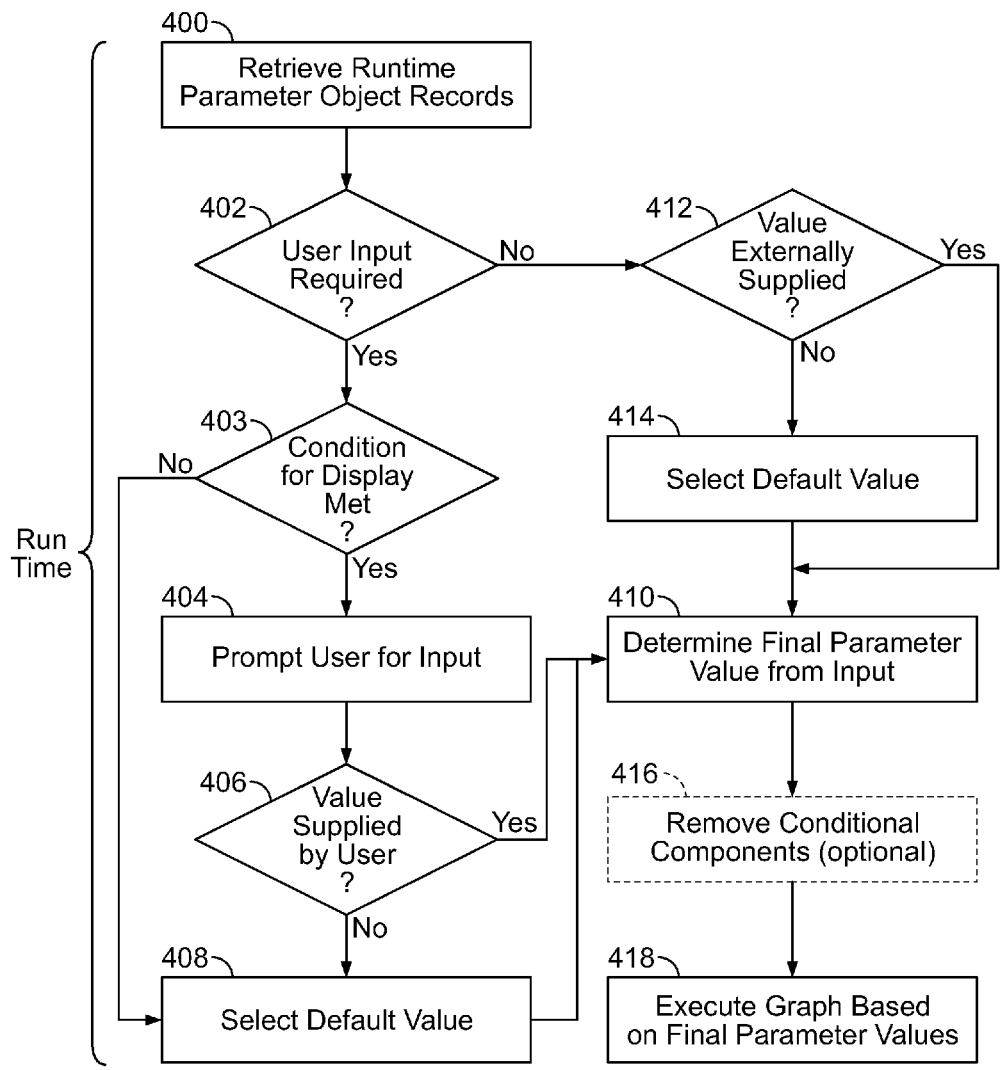
FIG. 4 is a flowchart that summarizes the process of using a runtime parameter.

FIG. 4 is a flowchart that summarizes the process of using a runtime parameter. During runtime, parameter objects corresponding to an application to be executed are retrieved (e.g., from a repository) (STEP 400). A determination is made for each such object as to whether user input is indicated (STEP 402). If so, a determination is made as to whether any condition for display of the prompt has been met (STEP 403), which may include evaluation of user input to prior prompts. If not, a default value is used (STEP 408). Alternatively, the parameter value may not be needed (e.g., a sort key would not be needed if the user did not choose to activate a sort function), and thus may be ignored. Otherwise, a prompt is generated for user input (STEP 404).

If the user does not input a value for a particular parameter (STEP 406), the default value for the parameter may be selected (STEP 408). Alternatively, an error condition may be raised to indicate the lack of user input. In any event (assuming no error condition because of a lack of user input), a determination is made of the final value for the parameter, taking into account transformations of the input and dependencies and conditions based on other parameters (STEP 410).

If a determination is made that user input is not indicated for a particular parameter (STEP 402), a determination is then made as to whether the parameter value is to be externally supplied programmatically, such as by an environment variable or a command line parameter (STEP 412). If not, the default value for the parameter is selected (STEP 414). Alternatively, an error condition may be raised to indicate the lack of available input of the specified type. In any event (assuming no error condition because of a lack of external input), a determination is made of the final value for the parameter, taking into account transformations of the input and dependencies and conditions based on other parameters (STEP 410).

Once the final parameter values are determined, as an optional step all conditional components (discussed below) can be removed either completely or replaced by flows (i.e., a graph link or edge), according to the specified conditions and the rules outlined above (STEP 416). Once the operational graph structure is finalized and the final parameter values are determined, the graph is executed in conventional fashion (STEP 418).

Test Values

In order to support a developer during the creation and testing of graphs with runtime parameters, the preferred embodiment of the GDE 102 also supports test values for runtime parameters. When a developer runs a graph with runtime parameters or wants to view the underlying code affecting a graph component, the GDE 102 displays an associated test parameters grid where the user can enter new test values for one or more runtime parameters. Preferably, the last set of test values used is remembered and saved with the graph.

For each runtime parameter, the developer enters a desired test value in a test value column. An edit field may be associated with each test value column. The test value field and edit field behave the same as the default value field and edit field in the runtime parameters grid 200 except when the parameter kind is PL.

If a PL expression indicates that the user is to be prompted for a value for a particular runtime parameter, then the test value field and the edit behavior are based on the interpretation of the associated PL expression. If the PL expression simply derives a value based on other input, then in normal mode the runtime parameter is not visible in the test values grid.

Specifying how Runtime Parameters Get their Values

After a parameter has been designated as a runtime parameter, a corresponding object is created in the repository 104. If the runtime parameter has a kind field 214 value of "PL", the default value field 308 for the parameter includes a prompt_for pseudo-function with the following preferred form:

prompt_for "prompt-kind [modifiers]" options . . .

As indicated above, the prompt_for pseudo-function may be part of a conditional expression that determines whether a prompt is to be displayed based on prior input.

For such objects, a user interface is used to present direct entry runtime parameters to a user. In the preferred embodiment, the Web Interface 108 provides this function. In particular, during runtime, each prompt_for pseudo-function of each runtime parameter object is parsed by the Web Interface 108 to generate a web page (e.g., in HTML) having a corresponding user prompt. (Alternatively, such web pages can be generated before runtime and simply presented at runtime. However, runtime generation of such web pages provides greater flexibility. In particular, the contents of a page can depend on prior user input.) The Web Interface 108 is used in conjunction with a conventional web browser that can display such web pages and receive user input.

The prompt_for pseudo-function indicates to the Web Interface 108 how to prompt for a parameter value. In particular, the prompt-kind parameter, a string constant, indicates what kind of user interface (UI) element to present (text box, dropdown list, etc.). The modifiers part of the string, a comma-separated list of keywords, provides some options common for various kinds of prompts. In the illustrated embodiment, space is not significant within the modifiers string. Modifier keywords are interpreted as follows:

The keyword in place declares that the element should be presented directly at the summary level user interface for an application, allowing the value to be supplied without "drilling in" to a lower level. If in place is not specified, a simple "edit" button is presented at the summary level interface which will takes a user to another page to supply the parameter value.

The keyword blank ok declares that a user need not supply a value; the application will deal with the default value in a reasonable way. If blank ok is not specified, then the user will not be able to execute the application without supplying some value.

Following are some examples of prompt_for calls with different kinds of modifiers:

${prompt_for "text,inplace"}
${prompt_for "filter, in place", $input_type}
${prompt_for "radio, blankok, in place", ${list 1, 2, 3}}

Figure 5:
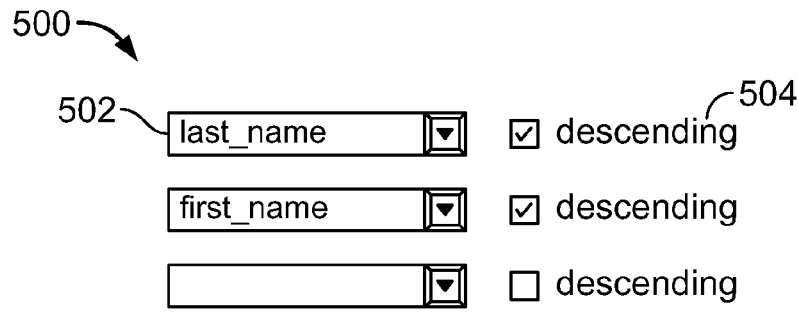
FIG. 5 is a diagram of one embodiment of a graphical dialog generated by the key prompt.

The remainder of this section lists a variety of prompt-kinds and their corresponding options and explains how each would appear in a web page generated by the Web Interface 108.

text [size]—Presents a conventional single-line text box size characters wide (if size is not supplied it defaults to the browser's default size for text boxes).

radio choice-list [description-list]—Presents a conventional "choose one" prompt in the form of a set of radio buttons, one button for each element of the choice-list. If description-list is supplied, each choice is labeled with the corresponding description; otherwise, the choices are labeled with the string form of the corresponding item from the choice-list.

radioplus choice-list [description-list]—Like radio, but presents an additional button next to a text box, to allow a user to choose a "write-in" value not in the choice-list.

checkbox choice-list [description-list]—Presents a conventional "choose zero or more" prompt in the form of a set of check boxes, one button for each element of the choice-list. If description-list is supplied, each choice is labeled with the corresponding description; otherwise, the choices are labeled with the string form of the corresponding item from the choice-list.

dropdown choice-list [description-list, size]—Presents a conventional "choose one" prompt in the form of a dropdown list for the elements of the choice-list. If description-list is supplied, each choice is labeled with the corresponding description; otherwise, the choices are labeled with the string form of the corresponding item from the choice-list. If size is supplied, that many choices will be visible at once; otherwise, only one will be visible.

multidropdown choice-list [description-list, size]—Presents a conventional "choose zero or more" prompt in the form of a dropdown list for the elements of the choice-list. If description-list is supplied, each choice is labeled with the corresponding description; otherwise, the choices are labeled with the string form of the corresponding item from the choice-list. If size is supplied, that many choices will be visible at once; otherwise, the browser's default number of items is shown.

key type-obj [size]—Presents a prompt for a key (also known as a collator) made up of fields from the given type-obj. The key can have as many as size parts, which defaults to the number of fields in type-obj. FIG. 5 is a diagram of one embodiment of a graphical dialog 500 generated by the key prompt. Following is an example of the script text for a 3-entry key prompt, where the file/datasets/fixed defines the contents of the available keys shown in the drop down boxes 502:

${prompt_for "key", ${dataset_type "/datasets/fixed"},3}

Figure 6:
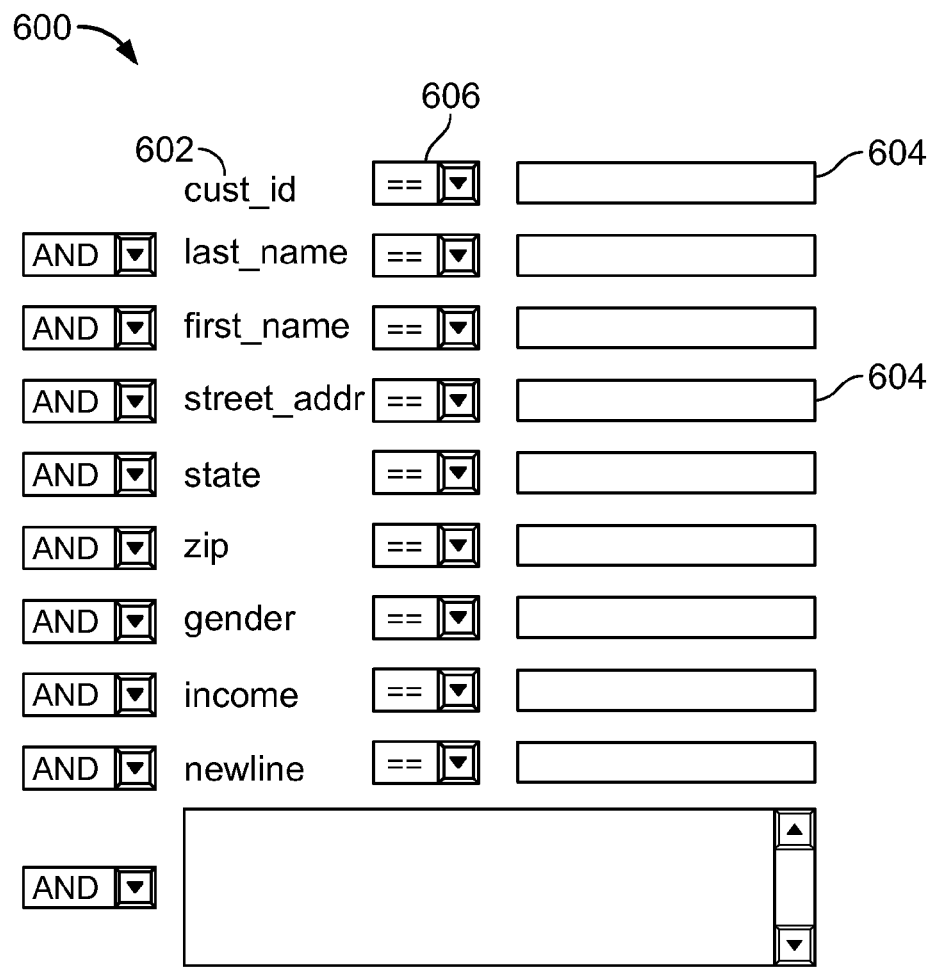
FIG. 6 is a diagram of one embodiment of a graphical dialog generated by the filter prompt.

In the illustrated embodiment, the normal collation order is ascending, but a user can select a descending collation order for a key by checking an associated check box 504.

filter type-obj—Presents a prompt for a filter expression made up of conditions on each field of the given type-obj. The blank ok modifier has no effect for filters; a blank filter yields a "True" expression. FIG. 6 is a diagram of one embodiment of a graphical dialog 600 generated by the filter prompt. The available field names 602 associated with each expression text edit box 604 are defined by type-obj. Comparison values are entered into the text edit boxes 604, and a comparison operator (e.g., equal, greater than, less than or equal to) is selected from a corresponding dropdown list control 606.

flexifilter type-obj—Similar to the filter prompt, but presents a prompt for a filter expression made up of conditions on each field of the given type-obj where the field name on each line is selectable from a dropdown list. This permits using the same field for multiple conditions (e.g., field STATE=MA OR field STATE=CA).

rollup type-obj key [size]—Presents a prompt for a rollup computation based on the fields of the given type-obj being rolled up by the given key. The rollup can have as many as size rules, which defaults to the number of fields in type-obj. The blank ok modifier has no effect for rollups; a blank rollup yields a package that provides just the key value for each group. FIG. 7 is a diagram of one embodiment of a graphical dialog 700 generated by the rollup prompt. In the illustrated embodiment, a column of dropdown boxes 702 defines the available rollup computation functions (e.g., sum, minimum, maximum). The available field names 704 associated with each computation are defined by type-obj. Each rollup rule has an associated text edit box 706 for user definition of a desired expression, a "where" text edit box 708 for defining (through a boolean expression) criteria under which the source value will take part in the computation, and an output field text edit box 710 for designating a field that will receive the computation result. In cases where it can be unambiguously derived, the name of the output field need not be specified.

reformat type-obj [size]—Presents a prompt for a reformat computation based on the fields of the given type-obj. The reformat can have as many as size rules, which defaults to the number of fields in type-obj. FIG. 8 is a diagram of one embodiment of a graphical dialog 800 generated by the reformat prompt. In the illustrated embodiment, the reformat prompt includes a section 802 for simply copying input fields to like-named output fields (either selected/deselected individually using checkbox controls or collectively by using Select All or Select None buttons). A second section of the prompt includes a column of text edit boxes 804 that allow definition of reformatting expressions (e.g., total=revenue_1−revenue_2). Each rule has an associated output field text edit box 806 for designating a field that will receive the reformatted result.

outputspec—Presents a prompt for an output dataset specification. The displayed control includes a dropdown control for presenting available format options, and a text edit box for entering the name of a specific instance of the output dataset. The blank ok modifier has no effect for output dataset specifications.

fpath starting-point—Presents a prompt for a file path. The prompt is essentially a text box, but has a "Browse" button next to it that will cause a popup window to appear for browsing for a file path. If the text box is non-blank, then it will be used as the starting point for the browsing operation; if it is blank, the starting-point argument is used.

rpath starting-point—Presents a prompt for a repository path. The prompt is essentially a text box, but has a "Browse" button next to it that will cause a popup window to appear for browsing. If the text box is non-blank, then it will be used as the starting point for the browsing operation; if it is blank, the starting-point argument is used.

radiofpath choice-list [description-list]—Like radioplus, but presents an fpath-style box-plus-browse-button in the "write-in" slot.

radiorpath choice-list [description-list]—Like radioplus, but presents an rpath-style box-plus-browse-button in the "write-in" slot.

Conditional Components

Some implementations include a conditional components mechanism that permits changes to the structure of the components and flows of a graph based on parameter values and computed metadata. Each component of a graph has a condition which controls whether or not that component will appear in the graph at runtime. The condition can be computed directly or indirectly through runtime parameters. Conditional components can be used for a variety of purposes, such as to optimize or specialize graphs. For optimization, an application might omit processing of certain datasets if values from them will not be used, thus allowing the graph to run more efficiently. For specialization, an application might condition the production of several different output datasets based on the level of detail desired, or allow execution of one of several optional portions of a graph.

FIG. 9A is a block diagram of a first graph in which a MergeJoin component 900 joins data from files A and B and outputs the result to an output file 902. FIG. 9B is a block diagram of a second graph in which a Rollup component 904 aggregates data from file A and outputs the result to an output file 902. FIG. 9C is a block diagram of a graph in which a MergeJoin component 906 joins data from files A and B, and a Rollup component 908 aggregates the resulting data and outputs a final result to an output file 902. Using conditional components, these three graphs can be combined into a single graph that initially looks like the graph of FIG. 9C, but the exact structure of which is not determined until runtime. By setting appropriate conditions, the Rollup component 908 can be replaced by a connection (flow), resulting in a runtime graph similar to the graph of FIG. 9A. Similarly, by setting appropriate conditions, the MergeJoin component 906 can be replaced by a connection (flow) to file A, resulting in a runtime graph similar to the graph of FIG. 9B.

In the illustrated embodiment, a conditional component can be any graph component that defines a vertex (i.e., a dataset component such as an input/output file, a processing component such as a reformat or sort component, or other graphs, known as subgraphs). In the preferred embodiment, a conditional component is controlled by two special parameters: a Condition and a Condition-interpretation. A Condition is a boolean expression or value whose evaluation is deferred until runtime. In the illustrated embodiment, the values "false" and "0" specify a false condition, all other values (including empty) indicate a true condition. A Condition-interpretation parameter has two allowed mutually exclusive values: Remove Completely and Replace With Flow.

Figure 10:
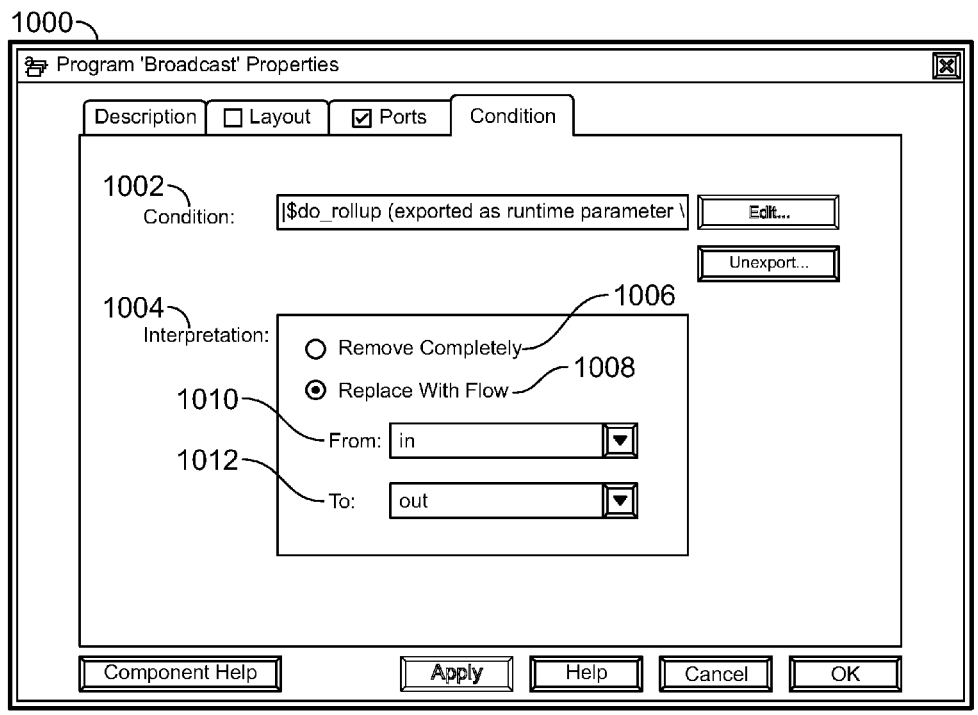
FIG. 10 is a diagram of one embodiment of a graphical dialog presenting a Condition having a Condition-interpretation control.

FIG. 10 is a diagram of one embodiment of a graphical dialog 1000 presenting a Condition 1002 having a Condition-interpretation control 1004. The Condition-interpretation control 1004 allows selection of either a Remove Completely interpretation 1006 or a Replace With Flow interpretation 1008.

Remove Completely: With this interpretation, if the Condition is met, the component and all of its connected flows (i.e., graph links or edges) are to be removed from the graph. An active Remove Completely condition functionally removes the component and all its directly connected flows from a graph. Remove Completely conditions can be used on any component.

Figure 11:
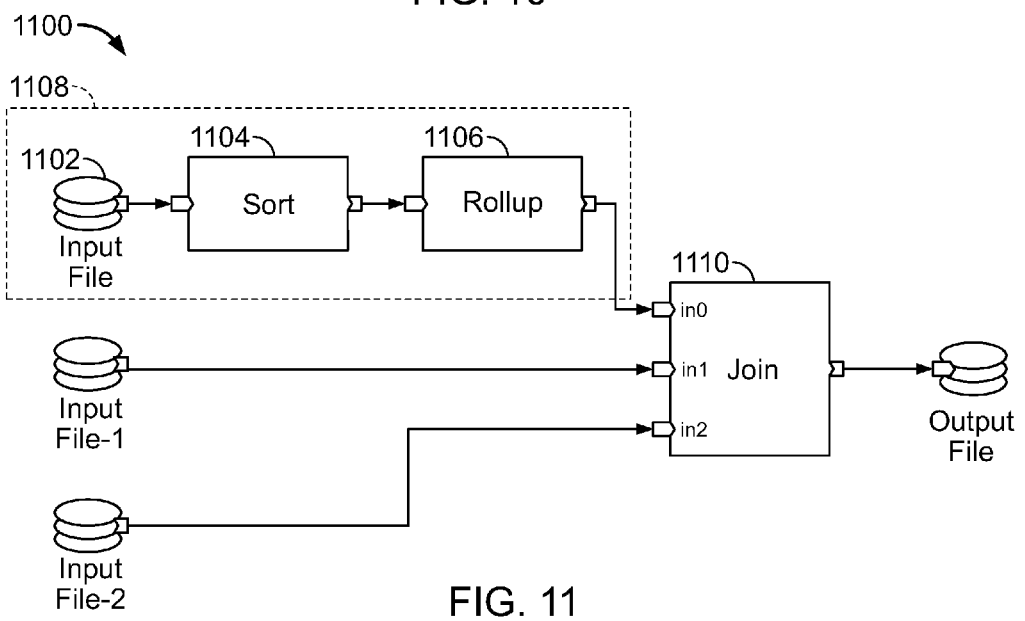
FIG. 11 is a diagram of a graph showing a situation in which poisoning arises.

A conditional component that is removed from a graph can "poison" other connected components that depend on the presence of the conditional component, causing their removal. FIG. 11 is a diagram of a graph 1100 showing a situation in which such poisoning arises. If the condition on the Input File component 1102 indicates removal and its corresponding condition-interpretation is Remove Completely, then both the Input File component 1102 and its connected flow are removed from the graph 1100. This in turn poisons the Sort component 1104, causing it to be removed because its input is a required input port, but there are no longer any data flows connected to it. This in turn poisons the Rollup component 1106, causing it to be removed because its input is a required input port, but there are no longer any data flows connected to it. The only thing that stops this "poison of disappearance" is connection to an optional or counted port of a downstream component.

Thus, the entire sort-rollup graph branch 1108 is effectively removed from the graph 1100 when the condition on the Input File component 1102 indicates removal. The result in FIG. 11 is that the nominally 3-input Join component 1110 of the original graph structure becomes a 2-input Join component at runtime.

In one implementation, the detailed semantics of poisoning (also known as "implied conditions") are as follows:
  If a component has a required port and there are no live flows connected to it, the component and all flows connected to it are removed from the graph.
  If a component is removed completely from a graph, then all flows connected to its ports are removed from the graph.
  If a component is replaced with a flow, then all flows connected to all ports other than that component's designated input port and designated output port are removed from the graph.
  If a required indexed port has no live flows connected to it, then for each corresponding optional indexed port with the same index, any flows connected to that corresponding port are removed from the graph.

There are some surprising consequences of these rules. For example, a component with only optional ports can never be removed because of poisoning. Therefore, it must be explicitly removed if desired.

Figure 12:
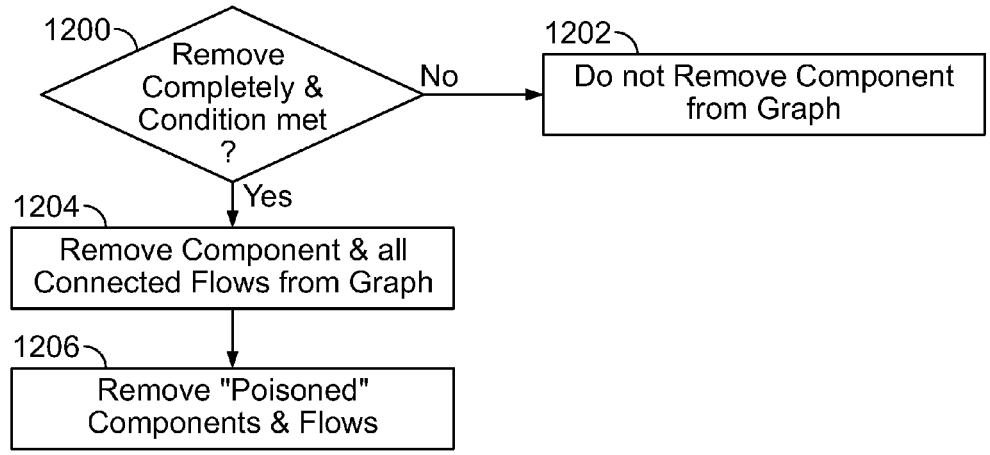
FIG. 12 is a flowchart that summarizes the process of runtime preparation of a graph that includes a Remove Completely conditional component.

FIG. 12 is a flowchart that summarizes the process of runtime preparation of a graph that includes a Remove Completely conditional component. If the Condition-interpretation is Remove Completely and the Condition is not met (STEP 1200), then the conditional COMPONENT is not removed from the graph (STEP 1202). If the Condition is met (Step 1200), then the conditional component is removed from the graph, along with all flows connected to that component (STEP 1204). All "poisoned" components and flows are then removed from the graph, in accordance with the rules set forth above (STEP 1206).

Replace With Flow: With this interpretation, if the Condition is met, the component is to be replaced with a flow (i.e., a graph edge). A Replace With Flow condition-interpretation needs additional information. Referring to FIG. 10, the user designates an input port 1010 (or a family of counted ports) and an output port 1012 (or a family of counted ports) through which to make connections when the component is removed from a graph. By default, if there is exactly one required input port or counted port, and exactly one required output port or counted port, those are the designated flow-through connection ports (termed the designated input port and the designated output port, respectively). A required port is one that requires at least one flow to be connected.

Figure 13:
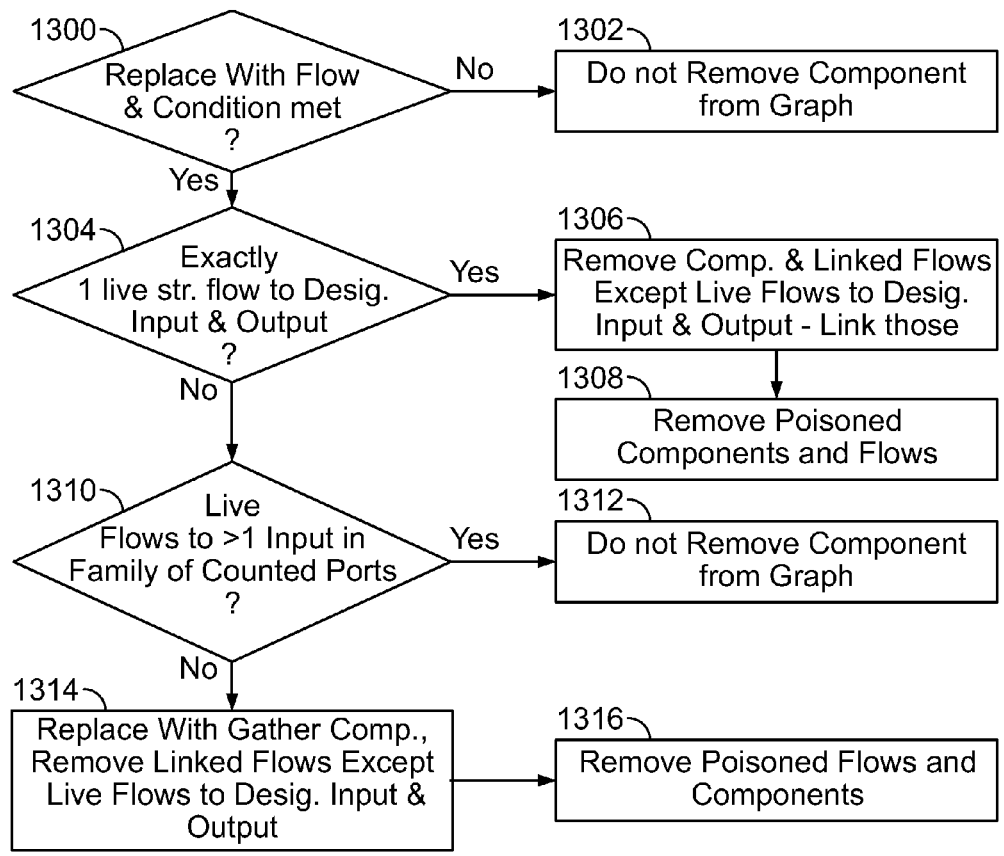
FIG. 13 is a flowchart that summarizes the process of runtime preparation of a graph that includes a Replace With Flow conditional component for a particular embodiment of the invention.

FIG. 13 is a flowchart that summarizes the process of runtime preparation of a graph that includes a Replace With Flow conditional component for a particular embodiment of the invention. Because of the dependency of some components on certain available inputs and outputs in the illustrated embodiment (which is based on components available in the CO>OPERATING SYSTEM®), several rules apply to this implementation and use of a Replace With Flow condition:
  If the Condition-interpretation is Replace with Flow and the Condition is not met (STEP 1300), then the conditional component is not removed from the graph (STEP 1302).
  A component with a designated input port and a designated output port can be replaced with a flow only if there is exactly one live straight flow connected to its designated input port, and exactly one live straight flow connected to its designated output port (a "live" flow is a flow that has not been removed at run-time) (STEP 1304). If so, the component itself is removed from the graph, and the straight live flow connected to its designated input port and the straight live flow connected to its designated output port are linked together (STEP 1306). Any other flows directly linked to the removed component's other ports (i.e., any ports other than the specially designated input and output ports) are removed from the graph. Any "poisoned" components and flows that were connected to the removed component are removed, as described above (STEP 1308).
  If a component with a Replace With Flow condition has live flows attached to more than one designated input port in a family of counted inputs (STEP 1310), then it is not removed from a graph, because the component is needed to make the graph valid (STEP 1312).
  Components that have live fan-in-flows on required inputs require special handling. A "live fan-in flow" means either the component has a live fan-in or all-to-all flow connected to a required input port, or it has more than one live straight flow connected to a single required input port. For such components, interpreting a Replace With Flow condition should replace the conditional component with a gather component which gathers all of live input flows (STEP 1314). Any "poisoned" flows and components that were connected to the replaced component are then removed, as described above (STEP 1316).

Aspects of Metadata Propagation

Metadata for a graph can be supplied, for example, by a graph developer, by a graph user, or by propagation from another portion of the graph. Various kinds of metadata can be propagated, including metadata associated with the data or computations on the data such as: a record format for a port (e.g., sequence of fields and data types of records flowing into or out of a port), sortedness, compression method, character set, binary representation (big-endian, little-endian), partitioning, what computing resources (e.g., processor, temporary disk space) the component may use, data transformations, and amounts of memory the component may use. Various aspects of graph construction can affect the propagation of metadata. Two of these aspects are described below.

Propagation after Component Removal

In some implementations, when a flow is generated after the removal of a graph component, a choice must be made as to how metadata defining the data in such flow should propagate in the revised graph. Metadata may be available from either end of the flow. In some implementations, the metadata from the upstream end of the flow is preferred.

If the upstream end of the flow is a removed component (or a component that has been replaced by a gather component), then the GDE 102 finds metadata for the flow by "walking" upstream in the graph until it finds a component that has not been removed. The metadata exposed by that upstream component is used to define the characteristics of the data for the generated flow.

Propagation of Transformed Metadata

Figure 23A:
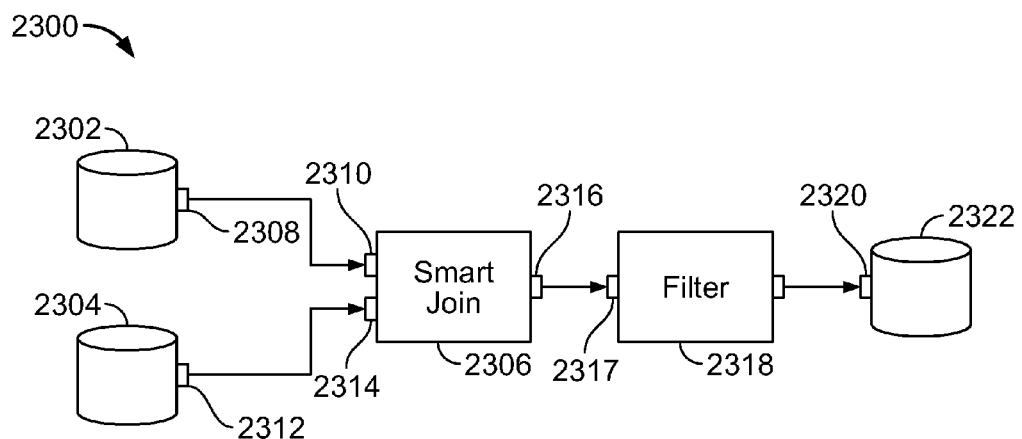
FIG. 23A is a diagram of a graph in which metadata is propagated.

As described above, metadata can propagate even over transforming internal data paths by allowing metadata associated with a port to be specified as a function of one or more parameters, including metadata for another port. For example, FIG. 23A shows a graph 2300 that computes a join operation on data from data set 2302 and data set 2304. In this example, a graph developer supplies metadata at output ports of the data sets. This metadata is then propagated to a "smart join" component 2306 that computes a join operation on the records of the input data sets. For example, metadata propagates from output port 2308 to input port 2310. The metadata is then transformed by the "smart join" component 2306 and propagated to an input port 2317 of a filter component 2318 from an output port 2316 of the "smart join" component 2306.

Figure 23B:
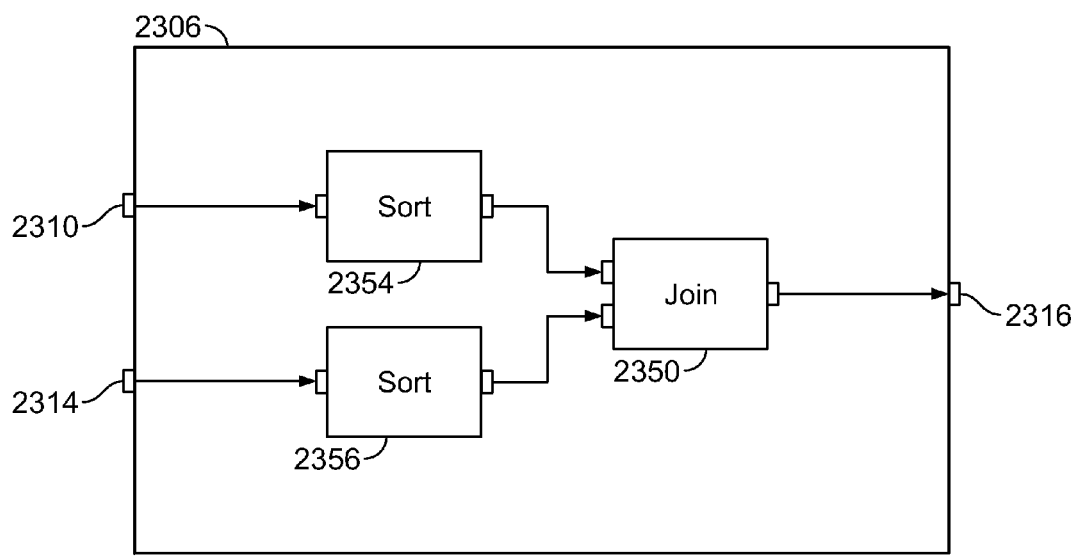
FIG. 23B is a diagram of a sub-graph for a component in the graph of FIG. 23A.

FIG. 23B shows a sub-graph implementing the "smart join" component 2306. The component 2306 uses a key_field parameter whose value represents the key field of the join operation performed by a join component 2350. The component 2306 also uses the key_field parameter as a condition for including conditional sort components 2354 and 2356. If the records flowing into the input port 2310 are already sorted on the key_field, then the sort component 2354 is conditioned out. Similarly, if the records flowing into the input port 2314 are already sorted on the key_field, then the sort component 2356 is conditioned out. If either flow of input records are not already sorted on the key_field, then the sort components 2354 and 2356 sort the records before they flow into the join component 2350.

To enable propagation of transformed metadata through this "smart join" component, a graph developer defines the metadata (e.g., metadata for describing the fields) for the output port 2316 of the "smart join" component 2306 as a function of metadata for the first input port 2310 input0.metadata, metadata for the second input port 2314 input1.metadata, and the key field parameter key_field:

output. metadata=metadata_join(key_field, input0.metadata, input1.metadata)

The output port metadata is determined by binding the function arguments to values (with respect to the appropriate context) and performing the function metadata_join on the results. In this example, since metadata for the ports 2310 and 2314 are undefined, propagated metadata are bound to the metadata parameters input0.metadata and input1.metadata. A user supplies metadata for the output port 2308 that specifies fields "A" and "B" for records flowing from port 2308 to input port 2310 of the "smart join" component 2306. The user also supplies metadata for the output port 2312 that specifies fields "A" and "C" for records flowing from port 2312 to input port 2314 of the "smart join" component 2306. This user-supplied metadata propagates to the ports 2310 and 2314. The key field for the join operation is field A, so the "formal parameter" key_field is bound to the value "A."

The function metadata_join determines the output metadata by first determining whether the value of the key_field parameter is a member of both sets of fields specified by input0.metadata and input1.metadata. If so, the output metadata is the union of the two sets of fields. If not, the output metadata indicates an empty set of fields.

After the metadata propagates to the input ports of the "smart join" component 2306 (or is otherwise supplied, for example, by a user), the transformed metadata for the output port of the "smart join" component 2306 includes fields A, B and C. This transformed metadata can then be propagated to other components. In this example, the transformed metadata propagates to the filter component 2318.

Metadata, whether supplied by a user or propagated between ports, can be displayed to the user. For example, the user can use an input device (e.g., a mouse) to select a portion of a component for which to view metadata values. The metadata propagation can also be triggered in response to such a user selection.

Exemplary Metadata Propagation Process

Figure 24:
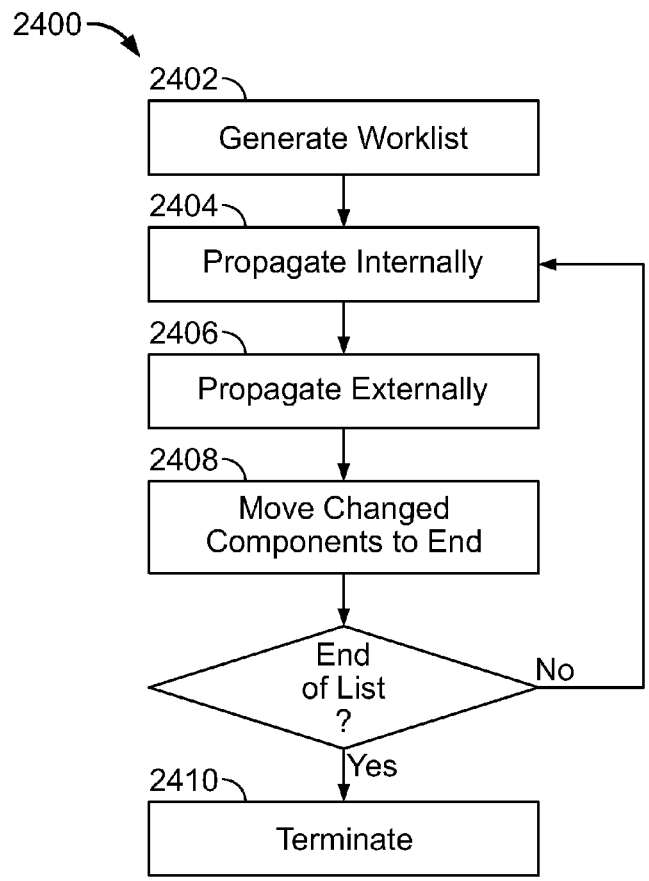
FIG. 24 is a flowchart for a metadata propagation process.

FIG. 24 shows a flowchart for an exemplary metadata propagation process 2400. The process 2400 can be performed, for example, each time there is a change in a graph, in response to a user action, and/or just before the graph is run. The process 2400 generates 2402 a worklist with each component in the graph ordered according to the partial ordering determined by the flows (e.g., component A comes before component B if there is a flow from component A to component B). Where flows do not determine a unique order between two components, alphabetic order of component labels may be used as a tie-breaker. This provides a stable ordering for the components in the worklist (assuming the component labels are unique). If the propagation process 2400 is repeated for a graph (e.g., after the addition of a new component), the new worklist preserves the same order between components previously in the worklist.

The process 2400 starts at the beginning of the worklist and, for each component in the worklist, the process 2400 propagates metadata internally 2404 within the component (e.g., from an input port to an output port, or from an output port to an input port) based on a specification of the sub-graph implementing the component (e.g., an data flow in the sub-graph). This internal metadata propagation includes transferring metadata untransformed between ports on either end of an non-transforming data path. Internal metadata propagation also includes deriving metadata for a port that has a metadata definition that refers to parameters of the graph and/or metadata for other port(s), as described above. When the process 2400 encounters such a metadata definition, the process 2400 evaluates any parameters whose values are needed to derive the metadata.

After performing internal metadata propagation for a component on the worklist, the process 2400 propagates metadata externally 2406 from each port of the component that has metadata to a port of a related component that does not have metadata. Any component that acquires metadata by this external propagation is moved 2408 to the end of the worklist. The process 2400 terminates 2410 after the last component on the worklist is processed.

One type of relationship between components that supports this type of external metadata propagation is a data flow link between ports of two components (e.g., from an input port to an output port, or from an output port to an input port).

Another type of relationship between components that supports this type of external metadata propagation is a link indicating that metadata for one port may also be used for another port. This type of "metadata link" does not necessarily correspond to a data flow link. For example, a port can have a metadata link to metadata in a graph that is not associated with any port in particular.

Runtime Parameters in Componentized Sub-Graphs

Before a sub-graph is "componentized" to be used as a component in another graph, various characteristics of the component are defined, such as the input and/or output ports of the component. For a sub-graph that includes components with runtime parameters, a prompting order for the runtime parameters should be selected. Since components in a graph are not necessarily sequentially ordered, there can be multiple possible global orderings of the runtime parameters for prompting a user. Some of the global orderings are not as consistent with the original orderings associated with each component. It is useful to generate a global ordering for prompting that preserves as much as possible the orderings of the parameters in each component, while reordering when appropriate to take dependencies into account. For example, a component may order a prompt asking "what data would you to process?" before a prompt asking "where would you like to store the processed data?" Even though it may be possible to provide the prompts in either order, it may be desirable to provide the prompts in this order.

Since it may be necessary to evaluate non-prompted runtime parameters in the process of evaluating prompted runtime parameters, the prompting order is obtained from an evaluation order for all of the runtime parameters. One approach for determining an evaluation order for the runtime parameters of a graph (including parameters for the graph that are not associated with any component) includes performing a topological sort based on one or more directed acyclic graphs representing dependencies among the parameters. However, some topological sort algorithms may reorder parameters unnecessarily, resulting in an undesirable prompting order for runtime parameters.

Sorting Example 1

In a first example, a parameter sorting process provides an initial list of parameters for parameters of two graph components: Component I, and Component II connected to Component I. In this example, the parameters have only "intra-component" dependencies. That is, parameters of a component depend only on other parameters in the same component. The parameters are defined as follows.
Component I includes the following parameters:
x=${prompt_for "text"}
y=x+${prompt_for "text"}
z=x+y+${prompt_for "text"}
q=${prompt_for "text"}
Component II includes the following parameters:
a=${prompt_for "text"}
b=a+${prompt_for "text"}
c=${prompt_for "text"}
The order in which the parameters are listed define a desired order in which to prompt a user for values. The initial list of parameters maintains this "initial ordering" for each component. An "ordinal" is assigned to each parameter to indicate that parameter's place in the initial ordering. The following table lists the parameters in this initial ordering.

| Parameter | Ordinal | Dependencies |
|---|---|---|
| x | 0 | |
| y | 1 | x |
| z | 2 | x, y |
| q | 3 | |
| a | 4 | |
| b | 5 | a |
| c | 6 | |

The "dependencies" column indicates other parameters on which the listed parameter depends. The dependencies impose an ordering constraint on the evaluation of the parameters: a parameter needs to be defined before it is used (e.g., referenced) by another parameter.

A "common topological sort" algorithm passes through the list transferring parameters with zero dependencies into an ordered output list on each pass. After each pass, any transferred parameters are removed from the dependencies column. This process repeats until all parameters have been transferred. The order of parameters in the output list represents the "final ordering" such that parameters that depend on other parameters are evaluated after those other parameters have been evaluated.

In this example, on the first pass, the parameters x, q, a and c are transferred into the output list. On the second pass, the parameters y and b are transferred into the output list. On the third and final pass, parameter z is transferred into the output list. Thus, the final ordering for the parameters is: x, q, a, c, y, b, z. While this ordering does satisfy the ordering constraint imposed by the parameter dependencies, it unnecessarily reorders the parameters. In this example, the initial ordering also satisfies the ordering constraint imposed by the parameter dependencies.

Other approaches for determining an evaluation order for the parameters of a graph that satisfies the ordering constraint do respect the initial ordering. For example, some approaches order the parameters to satisfy the ordering constraint, choosing the ordering according to a criterion based on the initial ordering. The criterion can include any of a variety of criteria that give preference to keeping the order close to the initial ordering (e.g., minimize a metric based on changes to the initial ordering). In some cases, there may not be a unique "best" ordering, since multiple orderings may satisfy a given criterion equally well according to the criterion.

An example of an approach that respects the initial ordering is a "modified topological sort" approach. In this approach, the criterion based on the initial ordering is to minimize the number of parameters that are transferred from the initial list before a preceding parameter that does not depend on any untransferred parameter is transferred. In other words, the "modified topological sort" removes a transferred parameter from the dependencies column before transferring the next parameter with zero dependencies. For the example above, the "modified topological sort" approach generates a final ordering that is the same as the initial ordering: x, y, z, q, a, b, c.

Modified Topological Sort Process Respecting Initial Ordering

Pseudocode is given below for two exemplary "modified topological sort" processes that both respect initial ordering as determined by an assigned ordinal for each parameter. The second process includes an optimization to improve time efficiency for some cases. The processes manipulate data structures generated from input data for the parameters.

Assuming there are N parameters to be ordered, the input data includes a list of N triples consisting of a unique parameter name, a set of parameters upon which the named parameter depends (called a "dependency set") and an optional attribute data object storing information related to the named parameter.

Associated with this input data are one or more directed acyclic graphs that represent the dependencies among the parameters, called "dependency graphs." Each unique parameter name corresponds to a node in a dependency graph, and the associated dependency set corresponds to a set of links from other nodes to that node. So a link points from a first node for a first parameter to a second node for a second parameter that depends on the first parameter. Alternatively, the correspondence between the link direction and parameter dependency could be reversed.

An output data structure result_list includes a list of the N parameters from the input data reordered (if necessary) so that a parameter is evaluated before it is used for evaluating another parameter while giving preference to keeping the order close to the initial ordering. To generate the output data structure result_list, the processes "eliminate" parameters by transferring parameters one at a time from a working data structure param_list to the output data structure result_list. The output data structure is complete after all parameters have been eliminated.

A first "modified topological sort" process includes two phases. In the first phase, the process builds working data structures based on the input data for use in generating the sorted output data structure. In the second phase, the process iteratively sorts and eliminates parameters according to the dependency constraint represented by these working data structures.

Some of the working data structures that the process builds in the first phase are dictionaries, which are data structures based on hashing. Items in dictionaries can be accessed effectively in O(log N) time. The following exemplary data structures are built in the first phase:

parm_list[index]: an ordered list of non-eliminated parameter names, indexed by a number index (where index=0 corresponds to the first item in the list). This data structure is "dynamic" (i.e., changes during the execution of the process). The list is indexed by position, such that if an item is removed from the middle of the list, then the index of items after the removed item are shifted accordingly.

n_dependencies_dict[name]: a dictionary keyed by a parameter name (name), whose entries contain the number of parameters on which the keyed parameter depends. This dictionary is dynamic.

dependers_dict[name]: a dictionary keyed by a parameter name (name), whose entries are dictionaries (also keyed by parameter name), representing the set of parameters that depend on the keyed parameter. This dictionary is "static" (i.e., does not change during execution of the process).

order_dict[name]: a dictionary keyed by a parameter name (name), storing the ordinal position, an integer ranging from 0 to N−1, of the parameter in the initial ordering. This dictionary is static.

attribute_dict[name]: a dictionary keyed by a parameter name (name), storing the optional attribute data object for the keyed parameter. This dictionary is static.

result_list[index]: an ordered list of parameter names and attributes representing the output of the process, indexed by a number index (where index=0 corresponds to the first item in the list). This data structure is initially empty. This data structure is dynamic.

For the purposes of analyzing the time efficiency of the processes, the average "degree" (or number of links from a node) of the dependency graphs is assumed to be z. Building these data structures take O(N) time, except for n_dependencies_dict and dependers_dict, which take O(N*z) time.

In the second phase, the process sorts the parameters in the param_list data structure according to a sort criterion by_n_deps_and_order that orders parameters first by the number of non-eliminated parameters on which they depend (i.e., by their value of n_dependencies_dict), from lowest to highest, and then by their ordinal (i.e., by their value of order_dict), from lowest to highest. The process then eliminates the first parameter in the sorted param_list. The value of n_dependencies_dict for this parameter should be zero. (If the value of n_dependencies_dict for the first parameter in the sorted param_list is not zero, then an error is flagged.)

To eliminate a parameter, the process appends it to result_list (along with any corresponding attributes) and decrements the dependency count (i.e., the value of n_dependencies_dict) of all of its dependers (i.e., parameters in dependers_dict) by one. Finally, the parameter is deleted from parm_list. This sorting and eliminating of the resulting first parameter is repeated until all parameters have been eliminated.

The following is a pseudocode definition for an eliminate procedure:

```
def eliminate(list, index):
    result_list.append( (list[index], attribute_dict[list[index]]))
    for depender in dependers_dict[list[index]]:
        n_dependencies_dict[depender] = n_dependencies_dict[depender] − 1
    delete list[index]
```

The arguments of the eliminate procedure are list (whose value is, e.g., param_list) and index. The function result_list.append appends the indicated list item at position index along with its associated attribute to result_list. Then, the procedure decrements the value of n_dependencies_dict for each parameter depender that is a member of the dependers_dict data structure, keyed on the parameter being eliminated. Then, the procedure deletes the parameter from list. The run time for the eliminate procedure is O(z log N).

The following is pseudocode for a sort/eliminate loop for the first "modified topological sort" process:

```
while parm_list is not empty:
    parm_list.sort(by_n_deps_and_order)
    while parm_list is not empty and n_dependencies_dict[parm_list[0]] == 0:
        eliminate(parm_list, 0)
        parm_list.sort(by_n_deps_and_order)
    if parm_list is not empty and n_dependencies_dict[parm_list[0]] > 0:
        delete parm_list[0]
        < record a circularity error and continue >
```

The process first performs an initial sorting of param_list using the function parm_list.sort(by_n_deps_and_order) that orders parameters of param_list according to the sort criterion by_n_deps_and_order described above. The process then performs the eliminate procedure followed by another sorting of param_list until param_list is empty. The process checks to make sure that the number of dependencies for the first parameter (with index=0) in param_list is zero. If not, the process removes the parameter, records a circularity error, and continues. The sort takes O(N log N) and the loop range is N, so the estimate for the overall run time for the loop is $O(N^2 \log N)$.

A second "modified topological sort" process takes advantage of the cases in which the dependency graphs are sparse, such that z<<N. After one initial sort, the process can maintain the sortedness of a list candidates of parameters that do not depend on any other parameters. This reduces this expected run time as described below.

The following is pseudocode for the second "modified topological sort" process:

```
parm_list.sort(by_n_deps_and_order)
while parm_list is not empty:
    # section 1
    candidates = [ ]
    for p in parm_list:
        if n_dependencies_dict[p] == 0:
            candidates.append(p)
    # section 2
```

-continued

```
while candidates is not empty and n_dependencies_dict[candidates[0]] == 0:
    this_parm = candidates[0]
    eliminate(candidates, 0)
    idx = parm_list.index(this_parm)
    delete parm_list[idx]
    tmp = get_new(this_parm)
    candidates = merge(candidates, tmp)
# section 3
if parm_list is not empty:
    parm_list.sort(by_n_deps_and_order)
    if n_dependencies_dict[parm_list[0]] > 0:
        delete parm_list[0]
        < record a circularity error and continue >
```

The process first performs an initial sorting of param_list using the function parm_list.sort(by_n_deps_and_order) that orders parameters of param_list according to the sort criterion by_n_deps_and_order described above. The process then performs a loop having three sections (labeled "# section 1," "# section 2," and "# section 3").

In section 1, the process builds a candidates list that contains only parameters with zero dependencies. The process scans all of the parameters in parm_list and appends them to candidates, preserving their relative ordering.

In section 2, the process performs a loop in which parameters from candidates are eliminated and new parameters are merged into candidates. The first parameter in candidates, saved as this_parm, is eliminated from candidates and deleted from param_list. A function get_new (this_parm) returns a list of names of parameters that are members of dependers_dict for the newly eliminated this_parm and have zero dependencies left. These parameters, representing parameters that have had their last dependency removed, are then sorted according to by_n_deps_and_order (to ensure they ordered according to their respective ordinals) and merged into candidates. Thus, the candidates list remains a list of zero-dependency parameters sorted by ordinal.

Section 3 is only entered if there is a "circularity error" caused, for example, when two parameters are defined in terms of each other. In this case, the process sorts parm_list again, and if the first parameter in parm_list has nonzero dependencies it is deleted and the loop repeats with section 1.

Assuming there are no circularity errors, the N-parameter list parm_list is sorted only at the beginning, resulting in a sorting time of $O(N \log N)$. Thereafter, sorting only occurs on the much smaller list of newly generated zero-dependency parameters resulting from eliminating the parameter at the head of the candidates list. The size of this list is less than z (on average), resulting in a sorting time of $O(z \log z)$ and a merging time of $O(z)$. Thus, one iteration of the loop is $O(z \log z)$ and the overall time is $O(Nz \log z + N \log N)$. For the cases in which z does not grow with increasing N, this time is effectively $O(N \log N)$.

Sorting Example 2

Figure 25A:
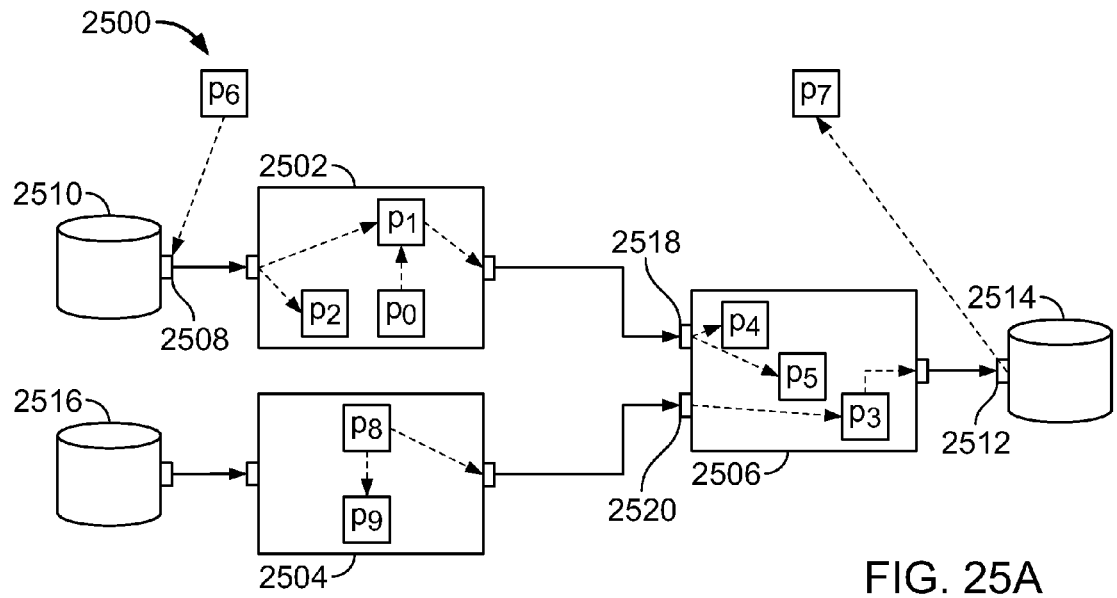
FIG. 25A is a graph including parameters that have intra-component and inter-component dependencies.

In another example, a parameter sorting process (e.g., the first or second "modified topological sort" process) determines an initial list of runtime parameters for a graph 2500 having graph components 2502, 2504 and 2506, as shown in FIG. 25A. The graph 2500 also has runtime parameters associated with an output port 2508 of an input data set 2510 and an input port 2512 of an output data set 2514. In this example, the parameters have both "intra-component" dependencies and "inter-component" dependencies. That is, parameters of a component depend on parameters in the same component and parameters in other components. In this example, the inter-component dependencies come about due to flows between components that enable propagation of metadata upon which some parameters depend.

Dependencies are indicated in FIG. 25A by a dotted arrow from a first parameter or port to a second parameter or port. An arrow to a port indicates that the value of the linked parameter propagates from that port to a downstream port. An arrow from a port indicates that a value is propagated to the linked parameter from an upstream port. An arrow from a first parameter to a second parameter indicates that the value of the second parameter depends on (e.g., references) the value of the first parameter.

Figures 25B, 25C:
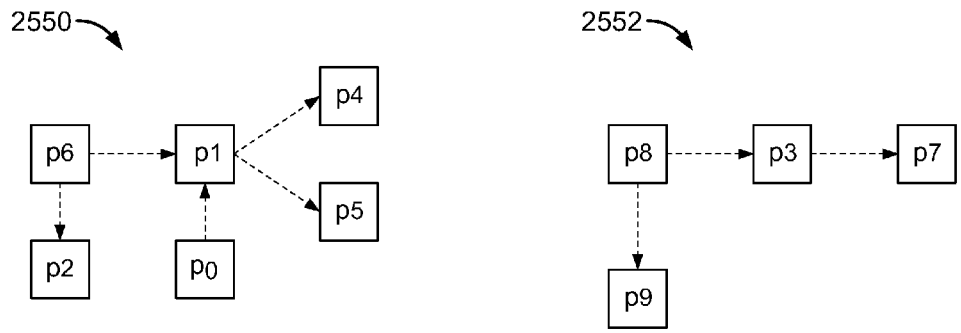
FIGS. 25B and 25C are dependency graphs representing dependencies among the parameters of the graph in FIG. 25A.

FIG. 25B shows a dependency graph 2550 that represents an ordering constraint among parameters p0, p1, p2, p4, p5 and p6 based on the graph 2500. FIG. 25C shows a dependency graph 2552 that represents an ordering constraint among parameters p3, p7, p8 and p9 based on the graph 2500.

The parameter sorting process assigns an ordinal to each of ten parameters p0, p2, . . . , p9 for various graph elements according to the order of placement of the elements in the graph 2500. In FIG. 25A, the first graph element added to the graph 2500 (e.g., by a user using the GDE 102) is component 2502 having parameter p0, p1 and p2. The second element added is component 2506 having parameters p3, p4 and p5. The third element added is data set 2510 having parameter p6. The fourth element added is data set 2514 having parameter p7. The last element added is data set 2516 having no runtime parameters. The following table lists the parameters in the initial ordering defined by the assigned ordinals.

| Parameter | Ordinal | Dependencies |
|---|---|---|
| p0 | 0 | |
| p1 | 1 | p0, p6 |
| p2 | 2 | p6 |
| p3 | 3 | p8 |
| p4 | 4 | p1 |
| p5 | 5 | p1 |
| p6 | 6 | |
| p7 | 7 | p3 |
| p8 | 8 | |
| p9 | 9 | p8 |

The following listings of the parameters in param_list and result_list at various stages of processing correspond to the first "modified topological sort" process described above. The param_list is shown sorted according to the sort criterion by_n_deps_and_order at each stage.

| param_list | result_list |
|---|---|
| p0 p6 p8 p2 p3 p4 p5 p7 p9 p1 | empty |
| p6 p8 p1 p2 p3 p4 p5 p7 p9 | p0 |
| p1 p2 p8 p3 p4 p5 p7 p9 | p0 p6 |
| p2 p4 p5 p8 p3 p7 p9 | p0 p6 p1 |
| p4 p5 p8 p3 p7 p9 | p0 p6 p1 p2 |
| p5 p8 p3 p7 p9 | p0 p6 p1 p2 p4 |
| p8 p3 p7 p9 | p0 p6 p1 p2 p4 p5 |
| p3 p9 p7 | p0 p6 p1 p2 p4 p5 p8 |
| p7 p9 | p0 p6 p1 p2 p4 p5 p8 p3 |
| p9 | p0 p6 p1 p2 p4 p5 p8 p3 p7 |
| empty | p0 p6 p1 p2 p4 p5 p8 p3 p7 p9 |

The following listings of the parameters in candidates and result_list at various stages of processing correspond to the second "modified topological sort" process described above. It is not necessary to sort candidates between stages since the parameters remain in the same order at each stage.

| candidates | result_list |
|---|---|
| p0 p6 p8 | empty |
| p6 p8 | p0 |
| p1 p2 p8 | p0 p6 |
| p2 p4 p5 p8 | p0 p6 p1 |
| p4 p5 p8 | p0 p6 p1 p2 |
| p5 p8 | p0 p6 p1 p2 p4 |
| p8 | p0 p6 p1 p2 p4 p5 |
| p3 p9 | p0 p6 p1 p2 p4 p5 p8 |
| p7 p9 | p0 p6 p1 p2 p4 p5 p8 p3 |
| p9 | p0 p6 p1 p2 p4 p5 p8 p3 p7 |
| empty | p0 p6 p1 p2 p4 p5 p8 p3 p7 p9 |

Figure 26:
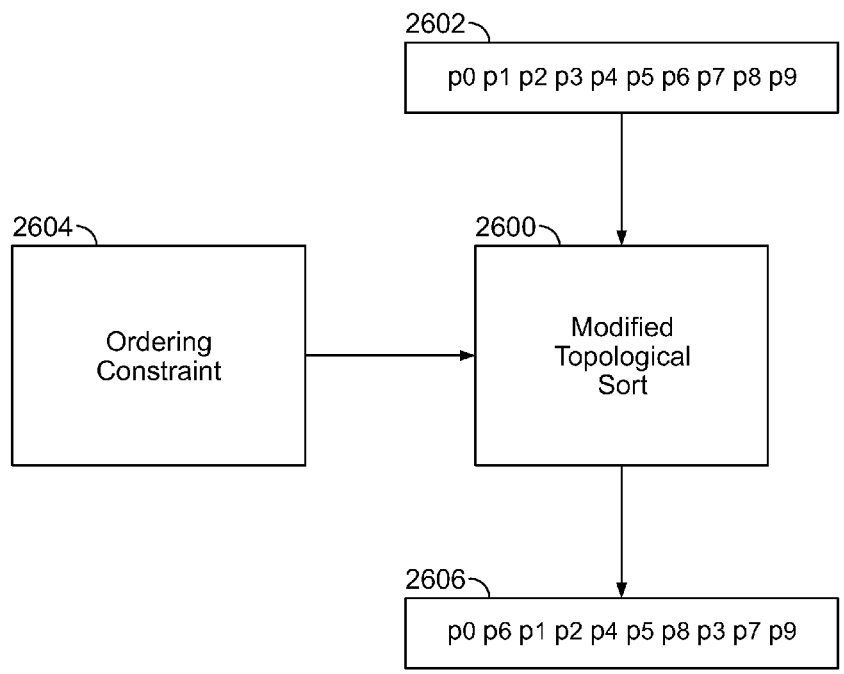
FIG. 26 is a diagram of a modified topological sort process.

Thus, referring to FIG. 26, the "modified topological sort" process 2600, takes as input a desired first ordering 2602 in which to prompt a user for values of runtime parameters, and an ordering constraint 2604 for the parameters (e.g., dependency graphs 2550 and 2552). The process 2600, provides the new ordering 2606 of the set of parameters that satisfies the ordering constraint according to the desired first ordering 2602.

Typical Usage

Typically, a user sits in front of the Web Interface 108 and finds in the repository 104 the graph of an application the user would like to run. By scanning all of the objects associated with the application graph, the Web Interface 108 generates web page forms that allow the user to specify values for the runtime parameters of the application. Once all runtime parameters have been specified, the combination of the application and the parameter settings are brought together as a job, which is scheduled for execution by the executive 110. When it comes time to run the job, the executive 110 queues the application for execution under the parallel operating system 106, in known fashion. The parallel operating system 106 collects tracking information and job status and stores this information in the repository 104 so that users and administrators can track the progress and performance of jobs.

Examples

Figure 14:
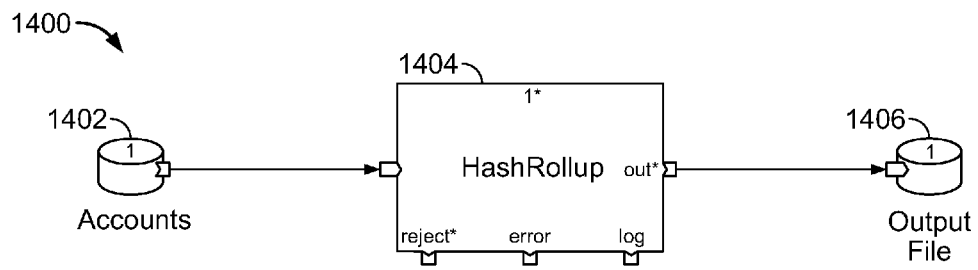
FIG. 14 is a diagram of a graph representing a rollup application without runtime parameters.

FIG. 14 is a diagram of a graph 1400 representing a rollup application without runtime parameters. This graph computes the number of accounts of each kind and writes the results to an output file. Every aspect of this application has been determined by the developer who created the graph: the name of the input file component 1402, the format of the input data, the key and transform rules used to roll up the data in a HashRollup component 1404, the output format, and the name of the output file component 1406. A user can only execute this graph exactly as defined.

Figure 15:
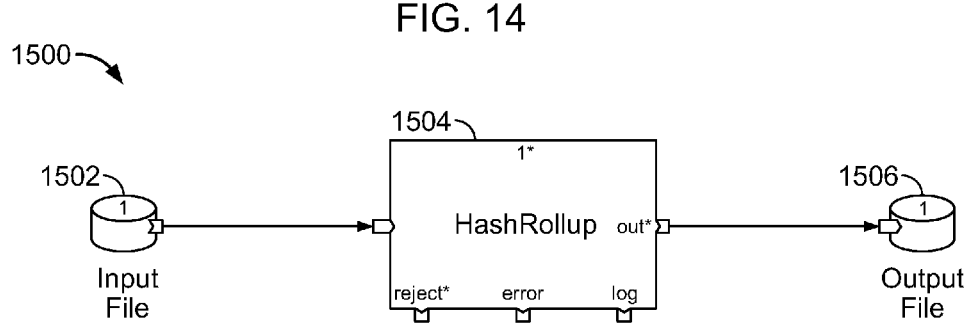
FIG. 15 is a diagram of a graph representing a runtime parameterized version of the rollup application of FIG. 14.

FIG. 15 is a diagram of a graph 1500 representing a runtime parameterized version of the rollup application of FIG. 14. The dataflow graph structure of this application is very similar to the non-runtime parameterized version, but the application is much more flexible. Through runtime parameters, an end user may specify the name of the abstracted input dataset 1502 (a reposited object from which the input file name and format will be derived), the rollup key and rollup rules for the HashRollup component 1504, and the name of the output file component 1506.

Figure 16:
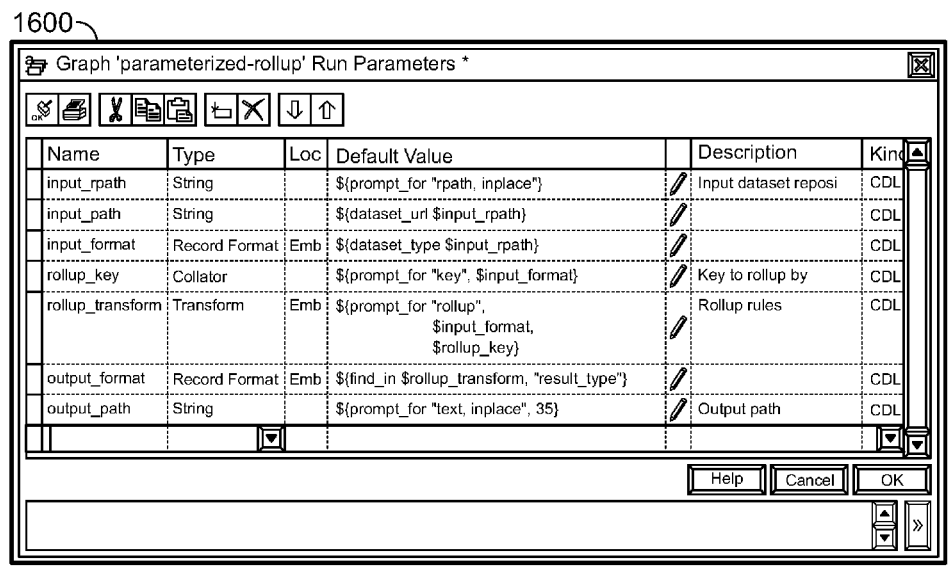
FIG. 16 is a diagram of one embodiment of a graphical dialog representing a runtime parameters grid for the example application of FIG. 15.

FIG. 16 is a diagram of one embodiment of a graphical dialog representing a runtime parameters grid 1600 for the example application of FIG. 15. This is a filled in version of the parameters grid shown in FIG. 2. Note that a number of default parameters are defined using the prompt_for pseudo-function, as described above, and thus require user input through the Web Interface 108. While the appearance of this graph differs little from the non-runtime parameterized application graph, one or more parameter grids (or other suitable control) enable a developer to completely track all parameters that control the execution of the graph.

FIG. 17A is a diagram of one embodiment of a graphical dialog representing a form 1700 generated by the Web Interface 108 from the information in the parameters grid 1600 of FIG. 16. In this example, the form 1700 presents four runtime parameters for user input: an input dataset repository path 1702, a rollup key 1704, rollup rules 1706, and an output path 1708. FIG. 17B is a diagram of the form 1700 of FIG. 17A filled in by a user with parameter values. Using direct entry and/or edit or browser control buttons associated with the runtime parameters 1702-1708, a user provides corresponding parameter values 1710-1716 for executing the associated graph.

Figure 18:
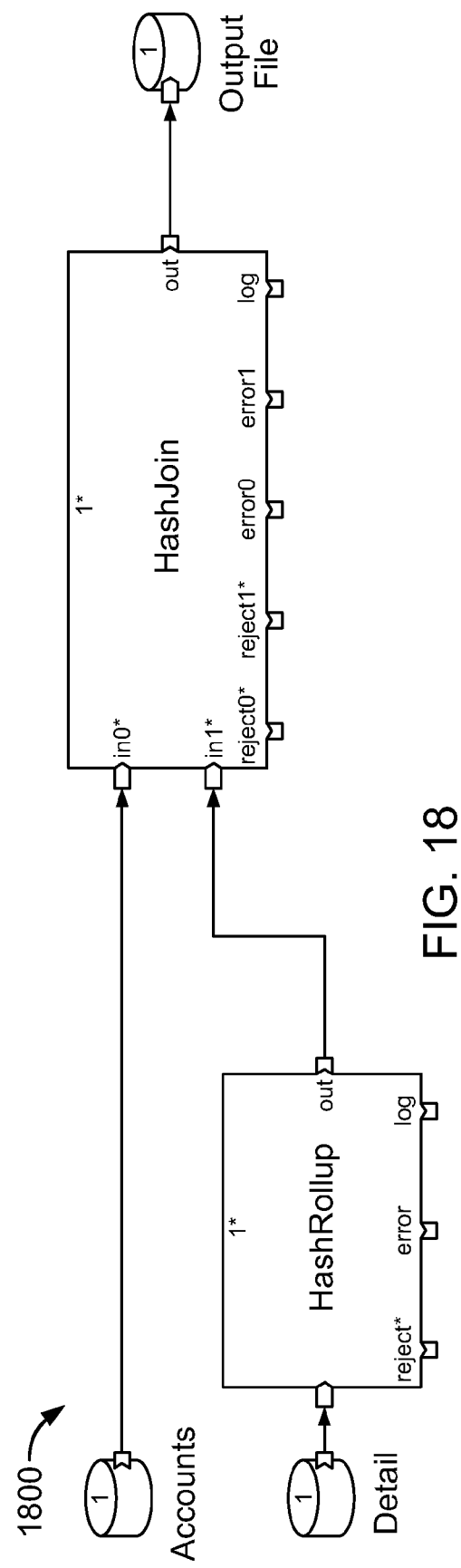
FIG. 18 is a diagram of a graph representing a runtime parameterized rollup and join application.
Figure 19:
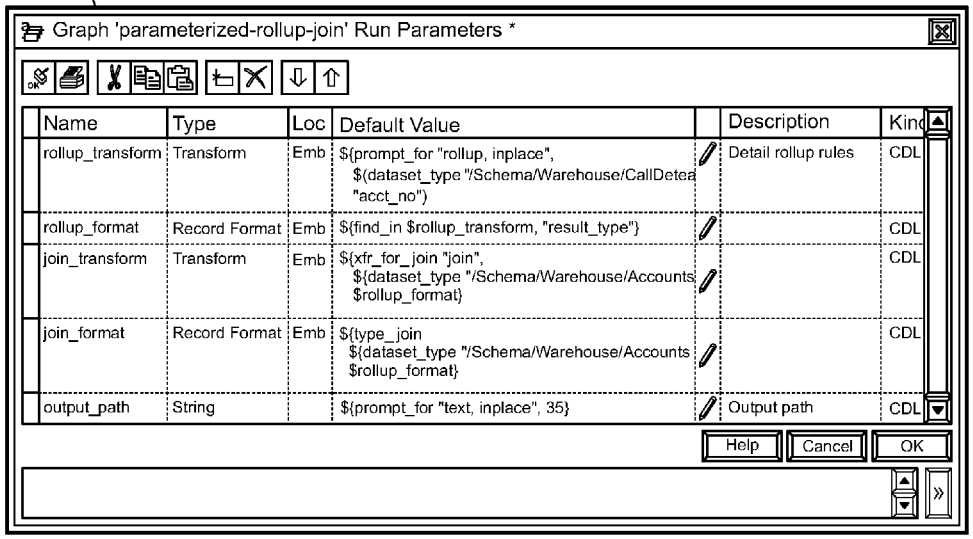
FIG. 19 is a diagram of one embodiment of a graphical dialog representing a runtime parameters grid for the example application of FIG. 18.
Figure 20:
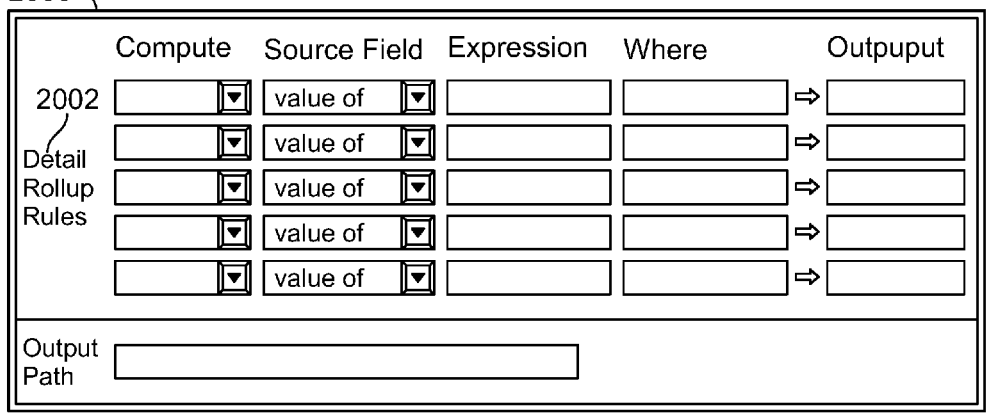
FIG. 20 is a diagram of one embodiment of a graphical dialog representing a form generated by the Web Interface from the information in the parameters grid of FIG. 19.

FIG. 18 is a diagram of a graph 1800 representing a runtime parameterized rollup and join application. FIG. 19 is a diagram of one embodiment of a graphical dialog representing a runtime parameters grid 1900 for the example application of FIG. 18. Here, some aspects of the application have been parameterized, but most, including the join key and the input datasets, remain fixed. FIG. 20 is a diagram of one embodiment of a graphical dialog representing a form 2000 generated by the Web Interface 108 from the information in the parameters grid 1900 of FIG. 19. Note that since the input type to the rollup is known at the time the top-level form is displayed, the rollup rules 2002 can be prompted for in-place.

Figure 21:
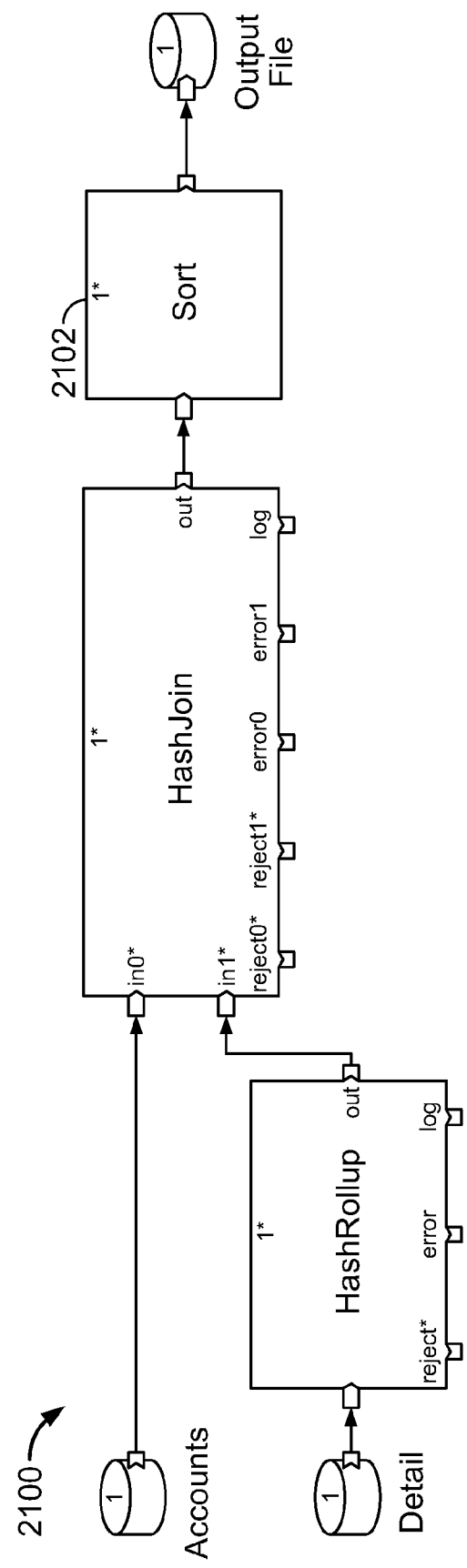
FIG. 21 is a diagram of a graph representing a runtime parameterized rollup-join-sort application.
Figure 22:
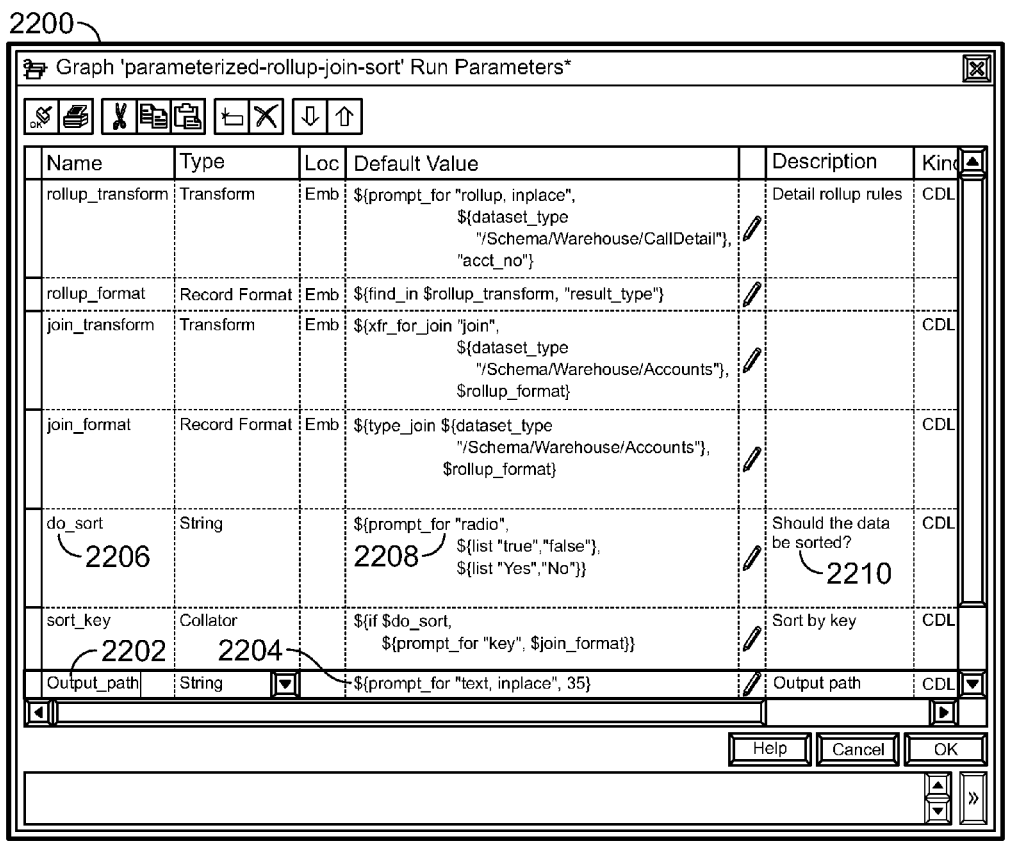
FIG. 22 is a diagram of one embodiment of a graphical dialog representing a runtime parameters grid for the example application shown in FIG. 21.

FIG. 21 is a diagram of a graph 2100 representing a runtime parameterized rollup-join-sort application. While similar to the example in FIG. 18, a conditional sort component 2102 has been added to the graph 2100. FIG. 22 is a diagram of one embodiment of a graphical dialog representing a runtime parameters grid 2200 for the example application shown in FIG. 21. The sort_key runtime parameter 2202 is prompted for only if the user indicates that sorting is desired. To get this effect, a develop puts a prompt_for pseudo-function within an if conditional test for the default value 2204 of the sort_key runtime parameter 2202. The if conditional test references a second runtime parameter, do_sort 2206. The default value field 2208 and description field 2210 of the do_sort parameter 2206 are defined to generate a radio prompt asking the user for a true/false or yes/no answer to the text prompt "Should the data be sorted?". If the value provided for the do_sort parameter 2206 is "true", the sort component 2102 will be included as part of the graph at runtime. Otherwise, the sort component 2102 will be removed completely from the graph or replaced with flow, depending on its specified condition interpretation.

Script Implementation

While the GDE 102 facilitates construction of parameterized graphs, sometimes there are non-graph programs for which one would like to provide a forms-based interface. Using application-level PL and the repository 104, one can parameterize arbitrary shell scripts. For example, the description of an application can be written to a file with a structure similar to the following:

```
application AppName (
    description("One-line Description"),
    comment ("Longer description"),
    parameter ParmName1 (
    string, kind (keyword), required,
    description ("Short prompt for top-level form"),
    comment ("Longer prompt for out-of-line form"),
    default($ {prompt_for ...})
    ),
    parameter ParmName2 (
    type, kind (derived),
    default (PL-expression)
    ),
    ... more parameters ...
    script(="scriptname.ksh")
)
```

General Computer Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on one or more programmable computer systems each comprising at least one processor, at least one data storage system (including volatile and non-volatile memory and/or storage elements), at least one input device or port, and at least one output device or port. The program code is executed on the processors to perform the functions described herein.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., solid state, magnetic, or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, a number of the function steps described above may be performed in a different order without substantially affecting overall processing. For example, STEPS 402 and 412 in FIG. 4 may be performed in reverse order. Accordingly, other embodiments are within the scope of the following claims.

What is claimed is:

1. A method for determining metadata associated with a graph-based computation by a process executed on a computer system, the method including:
    generating a partial ordering of graph elements in a graph, the partial ordering determined at least in part by links representing data flows interconnecting the graph elements; and
    determining metadata of the graph elements according to the partial ordering, including propagating metadata internally within individual graph elements, and propagating metadata externally between different graph elements,
    the internal metadata propagation including functionally transforming metadata that specifies at least one characteristic of data processed by a first portion of the graph to generate transformed metadata that specifies at least one characteristic of data processed by a second portion of the graph, and
    the external metadata propagation including
        identifying a third portion of the graph related to the second portion of the graph by a link representing a first data flow of data elements output from the second portion of the graph and received at the third portion of the graph, and
        propagating the transformed metadata that was generated for the second portion of the graph to the third portion of the graph according to the link representing the first data flow of data elements, and after propagating the transformed metadata, moving a graph element in the third portion of the graph to the end of the partial ordering.

2. The method of claim 1, wherein the first portion of the graph includes a first port of a first graph element and the second portion of the graph includes a second port of the first graph element, and the first data flow includes a data flow between the second port of the first graph element and a port of the graph element in the third portion of the graph.

3. The method of claim 2, wherein the first port of the first graph element and the second port of the first graph element are related by an internal data flow of the first graph element.

4. The method of claim 2, wherein the functional transformation includes a metadata definition that includes at least one reference to the metadata associated with the first port.

5. The method of claim 4, wherein the metadata definition defines metadata for the second port as a function of the referenced metadata.

6. The method of claim 2, wherein the second port is an output port and the port of the graph element in the third portion is an input port.

7. The method of claim 1, wherein the metadata being functionally transformed supplied by a user.

8. The method of claim 1, wherein the metadata being functionally transformed is propagated from a fourth portion of the graph.

9. The method of claim 1, further including propagating the transformed metadata in response to a change in connectivity of the graph.

10. The method of claim 1, further including propagating the transformed metadata in response to a user action.

11. The method of claim 1, further including:
receiving a request from a user; and
displaying metadata associated with a graph element to the user in response to the request.

12. The method of claim 11, wherein the request from the user includes input from the user selecting a graph element for which metadata is to be displayed.

13. The method of claim 12, wherein the input from the user includes positioning an on-screen pointer near a graphical representation of the selected graph element for a predetermined amount of time.

14. The method of claim 11, wherein the displayed metadata includes metadata propagated from another graph element.

15. The method of claim 11, wherein the displayed metadata is displayed before the graph is run.

16. Software stored on a non-transitory computer-readable medium, for determining metadata associated with a graph-based computation, the software including instructions for causing a computer system to:
generate a partial ordering of graph elements in a graph, the partial ordering determined at least in part by links representing data flows interconnecting the graph elements; and
determine metadata of the graph elements according to the partial ordering, including propagating metadata internally within individual graph elements, and propagating metadata externally between different graph elements,
the internal metadata propagation including functionally transforming metadata that specifies at least one characteristic of data processed by associated with a first portion of the graph to generate transformed metadata that specifies at least one characteristic of data processed by a second portion of the graph, and
the external metadata propagation including
identifying a third portion of the graph related to the second portion of the graph by a link representing a first data flow of data elements output from the second portion of the graph and received at the third portion of the graph, and
propagating the transformed metadata that was generated for the second portion of the graph to the third portion of the graph according to the link representing the first data flow of data elements, and after propagating the transformed metadata, moving a graph element in the third portion of the graph to the end of the partial ordering.

17. The software of claim 16, wherein the first portion of the graph includes a first port of a first graph element and the second portion of the graph includes a second port of the first graph element, and the first data flow includes a data flow between the second port of the first graph element and a port of a second graph element in the third portion of the graph.

18. The software of claim 17, wherein the first port of the first graph element and the second port of the first graph element are related by an internal data flow of the first graph element.

19. The software of claim 17, wherein the functional transformation includes a metadata definition that includes at least one reference to the metadata associated with the first port.

20. The software of claim 19, wherein the metadata definition defines metadata for the second port as a function of the referenced metadata.

21. The software of claim 17, wherein the second port is an output port and the port of the graph element in the third portion is an input port.

22. A system for determining metadata associated with a graph-based computation, the system including:
means for generating a partial ordering of graph elements in a graph, the partial ordering determined at least in part by links representing data flows interconnecting the graph elements; and
means for determining metadata of the graph elements according to the partial ordering, including propagating metadata internally within individual graph elements, and propagating metadata externally between different graph elements,
the internal metadata propagation including functionally transforming metadata that specifies at least one characteristic of data processed by a first portion of the graph to generate transformed metadata that specifies at least one characteristic of data processed by a second portion of the graph, and
the external metadata propagation including
identifying a third portion of the graph related to the second portion of the graph by a link representing a first data flow of data elements output from the second portion of the graph and received at the third portion of the graph, and
propagating the transformed metadata that was generated for the second portion of the graph to the third portion of the graph according to the link representing the first data flow of data elements, and after propagating the transformed metadata, moving a graph element in the third portion of the graph to the end of the partial ordering.

23. The system of claim 22, wherein the first portion of the graph includes a first port of a first graph element and the second portion of the graph includes a second port of the first graph element, and the first data flow includes a data flow between the second port of the first graph element and a port of a second graph element in the third portion of the graph.

24. The system of claim 23, wherein the first port of the first graph element and the second port of the first graph element are related by an internal data flow of the first graph element.

25. The system of claim 23, wherein the functional transformation includes a metadata definition that includes at least one reference to the metadata associated with the first port.

26. The system of claim 25, wherein the metadata definition defines metadata for the second port as a function of the referenced metadata.

27. The system of claim 23, wherein the second port is an output port and the port of the graph element in the third portion is an input port.

* * * * *